(12) United States Patent
Henry

(10) Patent No.: US 12,194,907 B2
(45) Date of Patent: Jan. 14, 2025

(54) LIQUID STORAGE TANK THAT IS REVERSIBLY RIGIDLY ATTACHABLE TO THE LIFT ARMS OF A SKID STEER OR TRACK LOADER

(71) Applicant: Darren Sean Henry, Shingletown, CA (US)

(72) Inventor: Darren Sean Henry, Shingletown, CA (US)

(*) Notice: Subject to any disclaimer, the term of this patent is extended or adjusted under 35 U.S.C. 154(b) by 391 days.

(21) Appl. No.: 17/857,358

(22) Filed: Jul. 5, 2022

(65) Prior Publication Data

US 2024/0010117 A1    Jan. 11, 2024

(51) Int. Cl.
| | | |
|---|---|---|
| *B60P 3/42* | (2006.01) | |
| *A62C 3/02* | (2006.01) | |
| *A62C 27/00* | (2006.01) | |
| *B60P 3/22* | (2006.01) | |
| *H02K 7/18* | (2006.01) | |

(52) U.S. Cl.
CPC ............ *B60P 3/426* (2013.01); *A62C 3/0292* (2013.01); *A62C 27/00* (2013.01); *B60P 3/2215* (2013.01); *H02K 7/1823* (2013.01)

(58) Field of Classification Search
CPC ...... A62C 27/00; B60P 3/2215; B60P 3/2205; B60P 3/22; B60P 3/0426
See application file for complete search history.

(56) References Cited

U.S. PATENT DOCUMENTS

| | | | |
|---|---|---|---|
| 6,340,177 B1* | 1/2002 | Granderson | ............ B60P 3/224 |
| | | | 280/833 |
| 7,168,443 B2* | 1/2007 | Smith | ................. A01M 7/0085 |
| | | | 137/565.17 |
| 2004/0104253 A1* | 6/2004 | Bieker | .................. B60P 3/2215 |
| | | | 222/608 |

* cited by examiner

*Primary Examiner* — Tuongminh N Pham
(74) *Attorney, Agent, or Firm* — Craig A. Simmermon

(57) ABSTRACT

This invention is a specially designed and shaped liquid storage tank that attaches directly to the lift arms of the skid steer or track loader. The storage tank holds a portion of the weight of the liquid in the storage tank directly over the tank treads or caterpillar tracks of the skid steer thereby greatly improving the stability of the skid steer to allow successful navigation of very rugged terrain even with a full load of liquid in the storage tank. At least thirty percent of the storage capacity of the storage tank is positioned behind the attachment plate or quick attachment plate of the skid steer or track loader. The invention may include a hydraulic water pump which can be used to spray water from the storage tank to fight wildfires. The invention may include a hydraulic power generator. The invention may include a fuel pump.

8 Claims, 18 Drawing Sheets

LIQUID STORAGE TANK THAT IS REVERSIBLY RIGIDLY ATTACHABLE TO THE LIFT ARMS OF A SKID STEER OR TRACK LOADER

BACKGROUND OF THE INVENTION

1. Field of the Invention

This invention relates to a special liquid storage tank that is reversibly rigidly attachable to the lift arms of a skid steer or track loader. A skid steer or track loader is a heavy duty piece of excavation equipment or excavation machinery that weighs 7,500 pounds or more. A skid steer or track loader has two continuous tracks called tank treads or caterpillar tracks that enable the skid steer or track loader to access and navigate terrain that would be too steep, rocky, muddy, or otherwise inaccessible to a vehicle without tank treads or caterpillar tracks. Skid steers or track loaders are produced by many different manufacturers or brands.

2. Description of Related Art

Skid steers and track loaders have carried liquid storage tanks in the prior art. Primarily this is done by first removing the bucket from the lift arms of the skid steer or track loader and then replacing the bucket with a fork lift attachment that connects to the lift arms of the skid steer or track loader wherein the fork lift attachment is used to lift up a pallet tank or tote tank filled with a liquid. A pallet tank or tote tank is a liquid storage tank that is fitted with fork lift holes or fork lift slots underneath the pallet tank or tote tank to allow the pallet tank or tote tank to be picked up with a fork lift or a fork lift attachment. With this configuration, the storage tank is not rigidly attached to the skid steer or track loader and is merely held by gravity holding the pallet tank or tote tank on the fork lift attachment. So, the storage tank could just slide off of the fork lift attachment if the storage tank is not kept level. Also, with this configuration, the weight of the storage tank is located much too far out in front of the skid steer or track loader which causes substantial instability of the skid steer or track loader thereby preventing the skid steer or track loader from traveling across rugged terrain.

Conversely, this invention uses a specially designed and shaped storage tank that attaches directly to the lift arms of the skid steer or track loader, thus providing a rigid and positive attachment to the skid steer or track loader. In addition, the specially designed and shaped storage tank holds a portion of the weight of the liquid in the storage tank directly over the tank treads or caterpillar tracks of the skid steer thereby greatly improving the stability of the skid steer or track loader so that this invention allows the skid steer or track loader to successfully navigate very rugged terrain, even with a full load of liquid in storage tank. There are no liquid storage tanks in the prior art that are reversibly rigidly attachable to the lift arms of a skid steer or track loader that hold the liquid in the storage tank directly over the tank treads or caterpillar tracks to greatly improve stability and terrain access of the skid steer or track loader. At least thirty percent of the storage capacity of the storage tank of this invention is positioned or located behind the attachment plate or quick attachment plate of the skid steer or track loader as described below. This moves the center of gravity of the storage tank substantially rearward, above the tank treads or caterpillar tracks, to greatly improve stability and terrain access of the skid steer or track loader.

A stable skid steer or track loader that can carry at least 300 gallons of water is extremely helpful and real a game-changer for firefighting and especially with fighting wild fires in the mountains and back country or other areas without any roads or trails. This invention includes an embodiment with a hydraulic pump attached to the storage tank and connected to a high pressure water nozzle wherein the skid steer or track loader operator can operate the high pressure nozzle from the cab to spray water on a wild fire. This invention provides the ability to carry 300 gallons or more of water through the mountains and back country in a very fast and dependable manner in order to use the water to quickly douse and extinguish wild fires and/or prevent the spread of wild fires. Also, a skid steer or track loader equipped with this invention could "go into the black" or break through a fire line in order to enter a burned out area to seek emergency shelter from a wild fire in the case of a rapid wind direction change. Prior to this invention, firefighters were limited to fork lift totes of water and/or firefighters on foot with small backpacks of water to fight fires in the mountains and back country. Applicant has first-hand knowledge of this because applicant is a firefighter and heavy machinery operator with years of experience fighting wild fires.

There is another embodiment of this invention that replaces the hydraulic water pump with a hydraulic power generator wherein this embodiment is used as a mobile work station that can be driven across mountains and back country to rescue another piece of machinery that may be broken down far away from any roads or trails. The hydraulic power generator is mounted on the storage tank and connected to the hydraulic lines of the skid street or track loader. The hydraulic power generator could be used to power a welder or any other power tools required for any repair. In this embodiment, the storage tank could be used to store water for firefighting purposes or fuel to refuel the broken piece of machinery.

There is another embodiment of this invention with an electric fuel pump wherein this embodiment is used as an all-terrain refuel vehicle that can be driven across the mountains and back country to refuel another piece of machinery far away from any roads or trails. The electric fuel pump is mounted on the storage tank and connected to the electrical system of the skid street or track loader. In this embodiment, the storage tank is used to store 300 gallons or more of fuel such as diesel or gasoline.

There are many other embodiments and uses that stem from the basic 300 gallon storage tank as shown and described below.

BRIEF SUMMARY OF THE INVENTION

It is an aspect of liquid storage tank that is reversibly rigidly attachable to the lift arms of a skid steer loader or track loader to be reversibly rigidly attachable to the attachment plate or quick attachment plate on the lift arms of a skid steer or track loader.

It is an aspect of liquid storage tank that is reversibly rigidly attachable to the lift arms of a skid steer loader or track loader to include a liquid storage tank that holds at least 300 gallons of a liquid.

It is an aspect of liquid storage tank that is reversibly rigidly attachable to the lift arms of a skid steer loader or track loader to rigidly attach to lift arms of a skid steer or track loader to allow the storage tank to lifted, rotated, and moved around just like a bucket or loader attachment would be able to be to lifted, rotated, and moved around.

It is an aspect of liquid storage tank that is reversibly rigidly attachable to the lift arms of a skid steer loader or track loader to rigidly attach to the attachment plate or quick attachment plate of the skid steer or track loader, thereby allowing the operator to move, lift, and rotate the storage tank exactly as a bucket attachment can be moved, lifted, and rotated.

It is an aspect of liquid storage tank that is reversibly rigidly attachable to the lift arms of a skid steer loader or track loader to have a special shape that holds a portion of the liquid in the storage tank directly over the tank treads or caterpillar tracks of the skid steer or track loader.

It is an aspect of liquid storage tank that is reversibly rigidly attachable to the lift arms of a skid steer loader or track loader to hold at least thirty percent of the liquid in the tank behind the attachment plate or quick attachment plate of the skid steer or track loader to greatly improve the stability of the skid steer or track loaded on steep, rocky, and/or muddy terrain.

It is an aspect of liquid storage tank that is reversibly rigidly attachable to the lift arms of a skid steer loader or track loader to include a fill port.

It is an aspect of liquid storage tank that is reversibly rigidly attachable to the lift arms of a skid steer loader or track loader to include a vent port.

It is an aspect of liquid storage tank that is reversibly rigidly attachable to the lift arms of a skid steer loader or track loader to include a shelf or bed on top of the tank to hold a person, tools, pumps, or other equipment.

It is an aspect of liquid storage tank that is reversibly rigidly attachable to the lift arms of a skid steer loader or track loader to include internal baffles to stabilize the liquid in the storage tank.

It is an aspect of liquid storage tank that is reversibly rigidly attachable to the lift arms of a skid steer loader or track loader in certain embodiments to include a hydraulic water pump that is attached to the tank and connected to or piped into the hydraulic lines of the skid steer or track loader.

It is an aspect of liquid storage tank that is reversibly rigidly attachable to the lift arms of a skid steer loader or track loader in certain embodiments to include a high pressure nozzle that is attached to the tank and connected to or piped into the hydraulic liquid pump.

It is an aspect of liquid storage tank that is reversibly rigidly attachable to the lift arms of a skid steer loader or track loader in certain embodiments to include a hydraulic power generator that is attached to the tank and connected to or piped into the hydraulic lines of the skid steer or track loader.

It is an aspect of liquid storage tank that is reversibly rigidly attachable to the lift arms of a skid steer loader or track loader in certain embodiments to include an electric fuel pump attached to the tank and connected to the electrical system of the skid steer or track loader.

DEFINITION LIST

Figure 1:
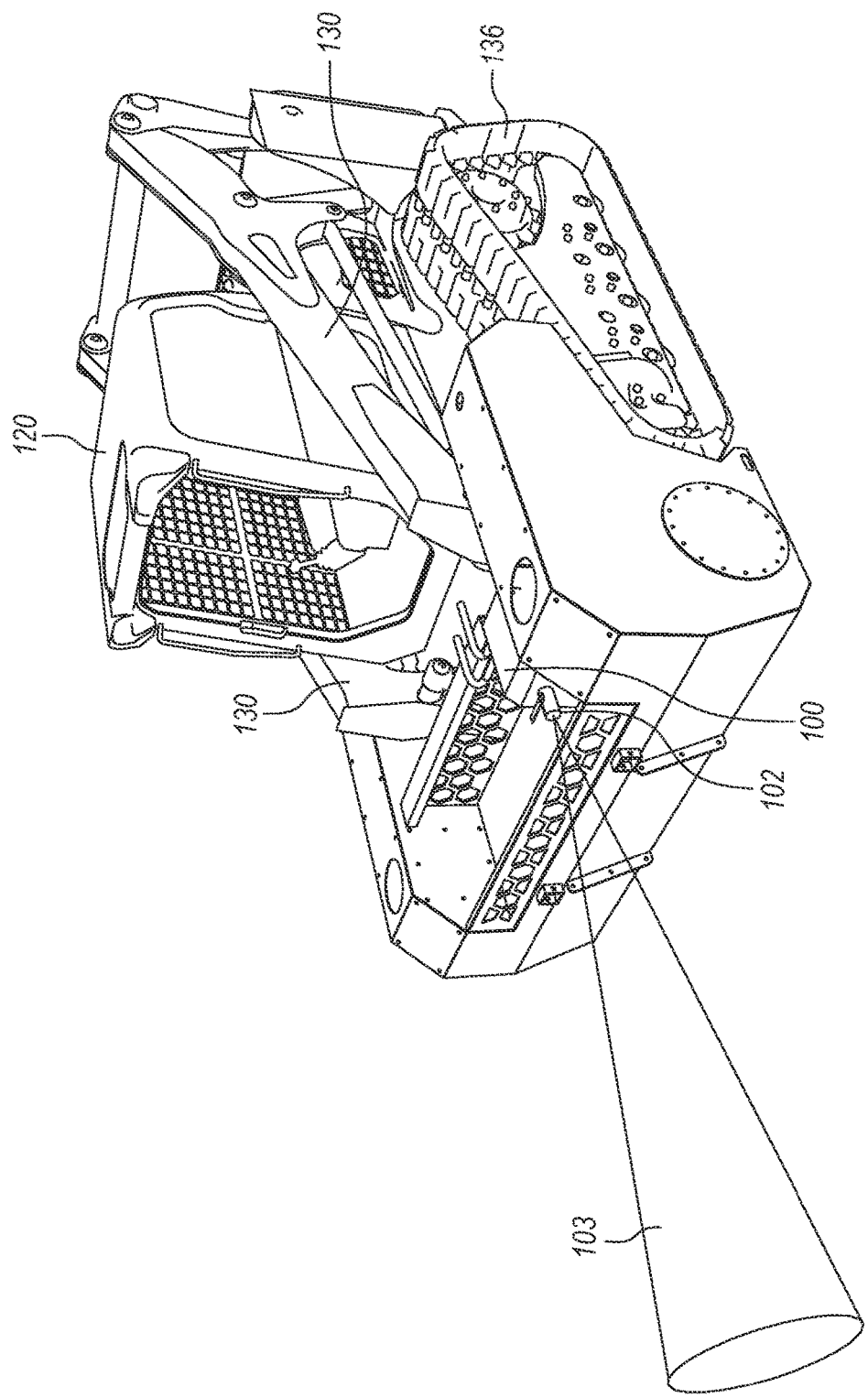
FIG. 1 is a perspective view of a first embodiment of the invention attached to the lift arms of a skid steer loader or track loader where the first embodiment includes a hydraulic water pump and a water nozzle for firefighting.

| Term | Definition |
|---|---|
| 5 | Liquid Storage Tank that is Reversibly Rigidly Attachable to the Lift Arms of a Skid Steer Loader or Track Loader |
| 7 | Left Cavity of Storage Tank |
| 8 | Right Cavity of Storage Tank |
| 9 | Center Cavity of Storage |
| 10 | Outer Left Side Panel |
| 11 | Horizontal Brake or Dimple in Outer left side panel |
| 12 | Access Port on Outer Left Side Panel |
| 14 | Access Port Cover on Outer Left Side Panel |
| 15 | Dog Ear on Outer Left Side Panel |
| 16 | Slot Or Hole on Dog Ear 15 |
| 18 | Inner Left Side Panel |
| 19 | Dog Ear on Inner Left Side Panel |
| 20 | Slot Or Hole on Dog Ear 19 |
| 22 | Left Top Panel |
| 24 | Fill Hole on Left Top Panel |
| 26 | Vent Hole on Left Top Panel |
| 28 | Main Bottom Panel |
| 30 | Left Bottom Panel |
| 32 | Lower Left Rear Panel |
| 34 | Upper Left Rear Panel |
| 36 | Left Front Diagonal Panel |
| 38 | Left Rear Diagonal Panel |
| 40 | Middle Rear Panel |
| 42 | Mount Plate Top Flange |
| 44 | Mount Plate Bottom Flange |
| 46 | Left Slot or Hole on Mount Plate Bottom Flange |
| 48 | Right Slot or Hole on Mount Plate Bottom Flange |
| 50 | Mount Plate Left Flange |
| 52 | Mount Plate Right Flange |
| 54 | Outer Right Side Panel |
| 55 | Horizontal Brake or Dimple in Outer Right side panel |
| 56 | Access Port on Outer Right Side Panel |
| 58 | Access Port Cover on Outer Right Side Panel |
| 59 | Dog Ear on Outer Right Side Panel |
| 60 | Slot or Hole on Dog Ear 59 |
| 62 | Inner Right Side Panel |
| 63 | Dog Ear on Inner Right Side Panel |
| 64 | Slot or Hole on Dog Ear 63 |
| 66 | Right Top Panel |
| 68 | Fill Hole on Right Top Panel |
| 70 | Vent Hole on Right Top Panel |
| 72 | Main Top Panel |
| 74 | Right Bottom Panel |
| 76 | Lower Right Rear Panel |
| 78 | Upper Right Rear Panel |
| 80 | Right Front Diagonal Panel |
| 82 | Right Rear Diagonal Panel |
| 84 | First Front Panel |
| 86 | Second Front Panel |
| 87 | Left Flange on Second Front Panel |
| 88 | Right Flange on Second Front Panel |
| 90 | Third Front Panel |
| 91 | Left Receiver on Third Front Panel |
| 92 | Right Receiver on Third Front Panel |
| 94 | First Retaining Wall |
| 96 | Second Retaining Wall |
| 97 | Left Bar Stand |
| 98 | Right Bar Stand |
| 100 | Water Pump |
| 102 | Water Nozzle |
| 103 | Water |
| 104 | Hydraulic Power Generator |
| 106 | Electric Fuel Pump |
| 110 | Fuel Pump Nozzle |
| 120 | Skid Steer or Track Loader |
| 130 | Lift Arms on 120 |
| 134 | Universal Adaptor Plate or Quick Attachment Plate on 130 |
| 136 | Left Tank Tread or Caterpillar Track on 120 |
| 138 | Right Tank Tread or Caterpillar Track on 120 |

DETAILED DESCRIPTION OF THE INVENTION

Liquid storage tank that is reversibly rigidly attachable to the lift arms of a skid steer loader or track loader 5 is reversibly rigidly attachable to the universal adapter plate or quick attachment plate 134 on the lift arms 130 of a skid steer or track loader 120. The universal adaptor plate or quick attachment plate 134 is mounted to or rigidly attached to the lift arms 130 of the skid steer or track loader 120. The universal adaptor plate or quick attachment plate 134 is typically permanently attached to the lift arms 130 of the skid steer or track loader 120 during production of the skid steer or track loader 120. All manufacturers or brands of skid steers or track loaders 120 use the same configuration of universal adaptor plate or quick attachment plate 134. Thus, liquid storage tank that is reversibly rigidly attachable to the lift arms of a skid steer loader or track loader 5 is reversibly rigidly attachable to the universal adaptor plate or quick attachment plate 134 of any brand or type of skid steer or track loader 120. The skid steer or track loader 120, the lift arms 130, and the universal adaptor plate or quick attachment plate 134 are not a part of this invention. Liquid storage tank that is reversibly rigidly attachable to the lift arms of a skid steer loader or track loader 5 is sometimes referred to below as "storage tank".

Liquid storage tank that is reversibly rigidly attachable to the lift arms of a skid steer loader or track loader 5 or storage tank is a watertight chamber, tank, or container capable of holding at least 300 gallons of liquid. Liquid storage tank that is reversibly rigidly attachable to the lift arms of a skid steer loader or track loader 5 or storage tank comprises: a left cavity 7, a right cavity 8, and a center cavity 9. Left cavity 7, right cavity 8, and center 9 cavity are all connected to yield one large multicavity storage tank. As described below, the liquid stored in left cavity 7 is located above the left tank tread or caterpillar tread 136 of the skid steer or track loader 120 and behind the universal adaptor plate or quick attachment plate 134 of the skid steer or track loader 120. Similarly, the liquid stored in right cavity 8 is located above the right tank tread or caterpillar tread 138 of the skid steer or track loader 120 and behind the universal adaptor plate or quick attachment plate 134 of the skid steer or track loader 120. This design moves the center of gravity of a skid steer with fully loaded storage tank substantially rearwards to greatly improve the stability of the load. With the lift arms 130 fully down, this design holds at least thirty percent of the liquid in a full tank behind the universal adaptor plate or quick attachment plate 134 of the skid steer or track loader 120. In addition, liquid storage tank that is reversibly rigidly attachable to the lift arms of a skid steer loader or track loader 5 can be lifted, rotated, and moved about just like a bucket or loader attachment could be lifted, rotated, and moved by the skid steer operator because the storage tank is attached to the attachment plate or quick attachment plate of the skid steer or track loader which is the same way a bucket is attached to the skid steer or track loader. Therefore, liquid storage tank that is reversibly rigidly attachable to the lift arms of a skid steer loader or track loader 5 can be carefully lifted upwards and rotated upwards during operation in order to shift the center of gravity even more rearwards, thereby very drastically improving the stability of the skid steer or track loader 120 with a full load of liquid. This design allows a full load of liquid to be dependably transported across mountainous country and back country that is without any roads or trails.

Liquid storage tank that is reversibly rigidly attachable to the lift arms of a skid steer loader or track loader 5 comprises: an outer left side panel 10; an inner left side panel 18; a left top panel 22; a main bottom panel 28; an left bottom panel 30; a lower left rear panel 32; an upper left rear panel 34; a left front diagonal panel 36; a left rear diagonal panel 38; a middle rear panel 40; an outer right side panel 54; an inner right side panel 62; a right top panel 66; a main top panel 72; an right bottom panel 74; a lower right rear panel 76; an upper right rear panel 78; a right front diagonal panel 80; a right rear diagonal panel 82; a first front panel 84; a second front panel 86; and a third front panel 90.

Figure 12:
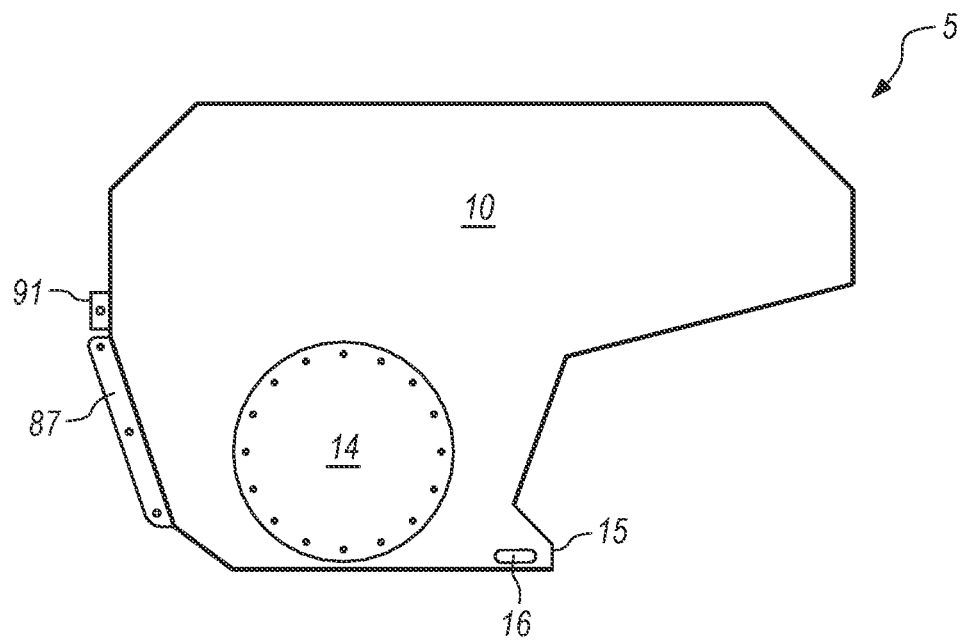
FIG. 12 is a left side elevation view of a 300 gallon size of liquid storage tank that is reversibly rigidly attachable to the lift arms of a skid steer loader or track loader.
Figure 13:
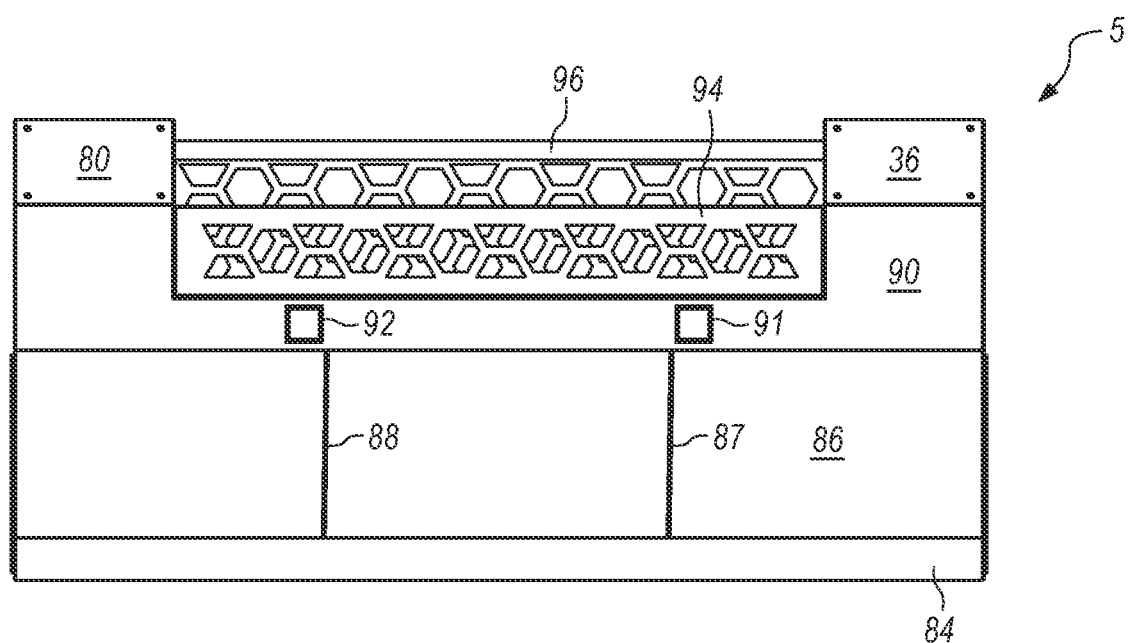
FIG. 13 is a front elevation view of a 300 gallon size of liquid storage tank that is reversibly rigidly attachable to the lift arms of a skid steer loader or track loader.
Figure 14:
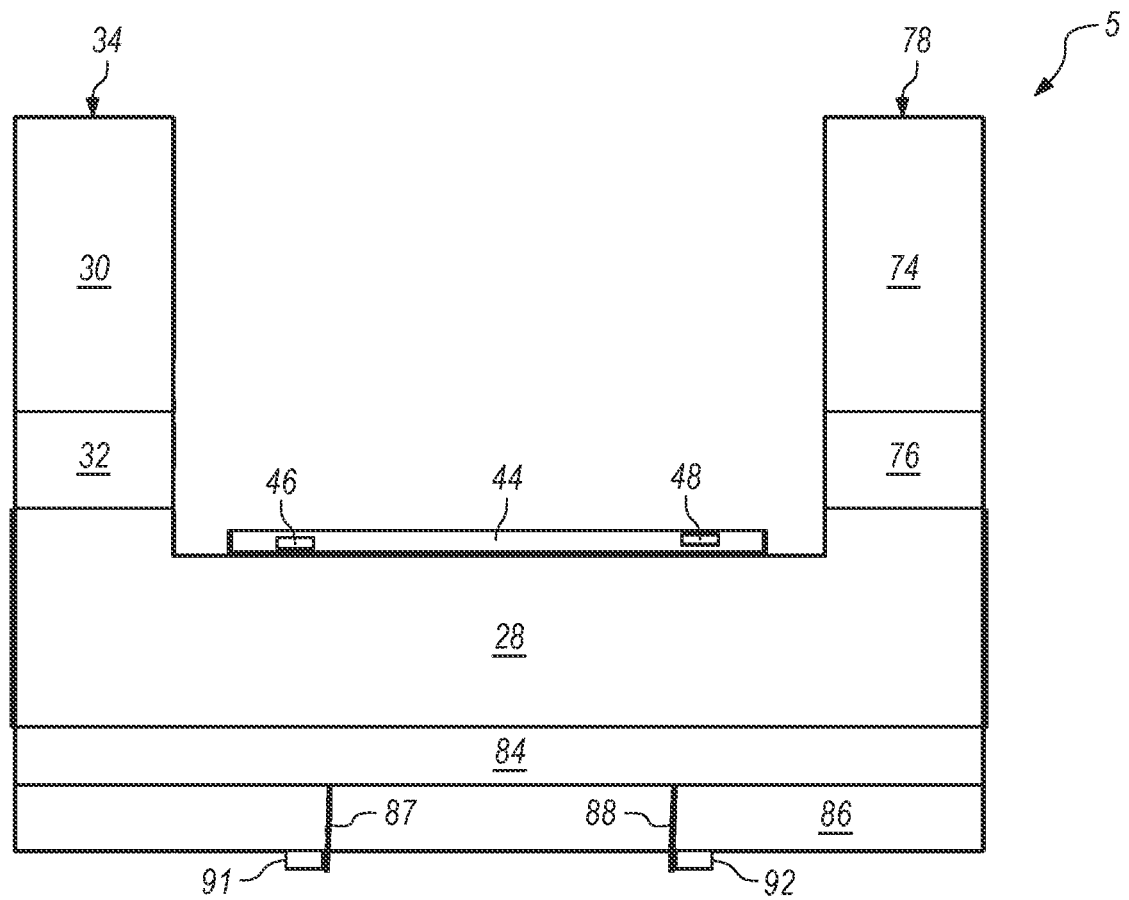
FIG. 14 is a bottom plan view of a 300 gallon size of liquid storage tank that is reversibly rigidly attachable to the lift arms of a skid steer loader or track loader.

Outer left side panel 10 is a rigid planar member that is winged-shaped. The winged-shaped panel has an extended portion or elongated portion that extends outwards, like the shape of a wing. Outer left side panel 10 has the shape of a right handed wing of a bird or an airplane as depicted in FIG. 12. The extended portion or elongated portion of outer left side panel 10 is the portion of the storage tank that extends rearwards and over the left tank tread or caterpillar track 136 of the skid steer or track loader 120. The positioning of this portion of the storage tank importantly relocates the center of gravity of the storage tank rearwards substantially, to a point that is behind or rearwards of the universal adaptor plate or quick attachment plate 134, and over top of the left tank tread or caterpillar track 136, to greatly improve the stability of the skid steer or track loader 120, even with a full load of liquid in the storage tank.

Outer left side panel 10 is a decagon or a ten-sided polygon. The decagon is irregular ten-sided polygon that forms the right handed wing shape. Outer left side panel 10 has an interior surface and an exterior surface. Outer left side panel 10 has a first side that is the horizontal lower side of outer left side panel 10. The first side of outer left side panel 10 is attached to the left side of main bottom panel 28 to form an airtight and watertight connection therebetween. The second side of outer left side panel 10 is adjacent to the first side of outer left side panel 10 moving clockwise around the outer left side panel 10. Second side of outer left side panel 10 forms an acute angle with the first side. Second side of outer left side panel 10 is attached to the left side of first front panel 84 to form an airtight and watertight connection therebetween. The third side of outer left side panel 10 is adjacent to the second side of outer left side panel 10 moving clockwise around the outer left side panel 10. Third side of outer left side panel 10 forms an acute angle with the second side. Third side of outer left side panel 10 is attached to the left side of the second front panel 86 to form an airtight and watertight connection therebetween. The fourth side of outer left side panel 10 is adjacent to the third side of outer left side panel 10 moving clockwise around the outer left side panel 10. Fourth side of outer left side panel 10 forms an acute angle with the third side. Fourth side is the vertical front side of outer left side panel 10. The fourth side of outer left side panel 10 is attached to the eighth side of the third front panel 90 to form an airtight and watertight connection therebetween. The fifth side of outer left side panel 10 is adjacent to the fourth side of outer left side panel 10 moving clockwise around the outer left side panel 10. Fifth side of outer left side panel 10 forms an acute angle with the fourth side. The fifth side of outer left side panel 10 is attached to the left side of left front diagonal panel 36 to form an airtight and watertight connection therebetween. The sixth side of outer left side panel 10 is adjacent to the fifth side of outer left side panel 10 moving clockwise around the outer left side panel 10. Sixth side of outer left side panel 10 forms an acute angle with the fifth side. Sixth side is the horizontal upper side of outer left side panel 10. The sixth side represents the leading edge of the right wing shape of the outer left side panel 10. The sixth side is the longest side of outer left side panel 10 and is about 1.25-5 times longer than the first side or lower side. The sixth side of outer left side panel 10 is attached to the left side of left top panel 22 to form an airtight and watertight connection therebetween. The seventh side of outer left side panel 10 is adjacent to the sixth side of outer left side panel 10 moving clockwise around the outer left side panel 10. Seventh side of outer left side panel 10 forms an acute angle with the sixth side. The seventh side of outer left side panel 10 is attached to the left side of left rear diagonal panel 38 to form an airtight and watertight connection therebetween. The eighth side of outer left side panel 10 is adjacent to the seventh side of outer left side panel 10 moving clockwise around the outer left side panel 10. Eighth side of outer left side panel 10 forms an acute angle with the seventh side. Eighth side of outer left side panel 10 is the vertical rear side of outer left side panel 10. The eighth side represents the tip of the right wing shape of the outer left side panel 10. The eighth side of outer left side panel 10 is attached to the left side of upper left rear panel 34 to form an airtight and watertight connection therebetween. The ninth side of outer left side panel 10 is adjacent to the eighth side of outer left side panel 10 moving clockwise around the outer left side panel 10. Ninth side of outer left side panel 10 forms an acute angle with the eighth side. The ninth side represents the trailing edge of the right wing shape of outer left side panel 10. The ninth side is as long or longer than the first side of outer left side panel 10. The ninth side of outer left side panel 10 is attached to the left side of left bottom panel 30 to form an airtight and watertight connection therebetween. The tenth side of outer left side panel 10 is adjacent to the ninth side of outer left side panel 10 moving clockwise around the outer left side panel 10. Tenth side of outer left side panel 10 forms an acute angle with the ninth side. The tenth side of outer left side panel 10 is attached to the left side of lower left rear panel 32 to form an airtight and watertight connection therebetween. Outer left side panel 10 may further comprise: an access port and an access port cover 14. Access port 12 is a circular, triangular, square, or rectangular hole or void in outer left side panel 10. Access port 12 functions to provide access or an access hole into the interior of the storage tank to clean, inspect, and repair the interior of the storage tank. Access port cover 13 is a rigid planar member in the same shape as access port 12. Access port cover 14 is a cover or lid that is reversibly attachable to access port 12 that makes an airtight and watertight connection with access port 12 when attached to access port 12. In best mode this attachment is done with fasteners located around the full perimeter of access port cover 14.

The tenth side of outer left side panel 10 may further comprise: a dog ear 15 and a slot or hole 16. Dog ear 15 is an ear-shaped extension or protrusion extending outwards from the tenth side of outer left side panel 10. Dog ear 15 protrudes about 3-10 inches outward. Slot or hole 16 is a circular hole or slotted hole on dog ear 15. Dog ear 15 and slot or hole 16 function to provide a tie down point or hook to help attach or hook peripheral equipment to the skid steer or track loader 120. Dog ear 15 and slot or hole 16 provides a stable hook point to attach a plow, bucket, blade, or other equipment to the skid steer or track loader 120. Dog ear 15 and slot or hole 16 are not required for proper functioning of the storage tank and are added only as optional upgrades.

Inner left side panel 18 is a rigid planar member that is a mirror image of outer left side panel 10 except with a rectangular notch cut out. The rectangular cut-out represents the portion of the storage tank underneath the main top panel 72 or the center cavity 9 of the storage tank that connects the left cavity 7 of the storage tank to the right cavity 8 of the storage tank. Like outer left side panel 10, inner left side panel 18 has the shape of the right handed wing of a bird or an airplane as depicted. The extended portion or elongated portion of inner left side panel 18 is the portion of the storage tank that extends rearwards and over the left tank tread or caterpillar track 136 of the skid steer or track loader 120. The positioning of this portion of the storage tank importantly relocates the center of gravity of the storage tank rearwards substantially, to a point that is behind or rearwards of the universal adaptor plate or quick attachment plate 134, and over top of the left tank tread or caterpillar track 136, to greatly improve the stability of the skid steer or track loader 120, even with a full load of liquid in the storage tank.

Inner left side panel 18 is decagon or a ten-sided polygon. The decagon is irregular ten-sided polygon that forms the right handed wing shape with the rectangular notch cut out. Inner left side panel 18 has an interior surface and an exterior surface. Inner left side panel 19 has a first side that corresponds and matches with the first side of outer left side panel 10 except for the portion that is cut out by the rectangular notch cut out. Inner left side panel 18 has a second side that is the vertical side of the rectangular notch cut out. Inner left side panel 18 has a third side that is the horizontal side of the rectangular notch cut out. Inner left side panel 18 has a fourth side that is that corresponds and matches with the fourth side of outer left side panel 10. Inner left side panel 18 has a fifth side that is that corresponds and matches with the fifth side of outer left side panel 10. Inner left side panel 18 has a sixth side that is that corresponds and matches with the sixth side of outer left side panel 10. Inner left side panel 19 has a seventh side that is that corresponds and matches with the seventh side of outer left side panel 10. Inner left side panel 18 has an eighth side that is that corresponds and matches with the eighth side of outer left side panel 10. Inner left side panel 18 has a ninth side that is that corresponds and matches with the ninth side of outer left side panel 10. Inner left side panel 18 has a tenth side that is that corresponds and matches with the tenth side of outer left side panel 10.

The tenth side of inner left side panel 18 may further comprise: a dog ear 19 and a slot or hole 20. Dog ear 19 is an ear-shaped extension or protrusion extending outwards from the tenth side of inner left side panel 18. Dog ear 19 protrudes about 3-10 inches outward. Slot or hole 20 is a circular hole or slotted hole on dog ear 19. Dog ear 19 and slot or hole 20 function to provide a tie down point or hook to help attach or hook peripheral equipment to the skid steer or track loader 120. Dog ear 19 and slot or hole 20 provides a stable hook point to attach a plow, bucket, blade, or other equipment to the skid steer or track loader 120. Dog ear 19 and slot or hole 20 are not required for proper functioning of the storage tank and are added only as optional upgrades.

Left top panel 22 is a rigid rectangular planar member with an interior surface, an exterior surface, longitudinal axis, a left side, a front side, a right side, and a rear side.

Left top panel 22 may further comprise: a fill hole 24 and a vent hole 26. Fill hole 24 is a circular, triangular, square, or rectangular hole or void in left top panel 22. Fill hole 24 functions to provide a port to the interior of the storage tank that is used to fill the storage tank with a liquid such as water, foam, diesel fuel, or gasoline. Fill hole 24 has a cover or lid (not depicted) that provides and airtight and water tight seal when attached to the fill hole 24. Vent hole 26 is a circular, triangular, square, or rectangular hole or void in left top panel 22. Vent hole 26 functions to provide a port to the interior of the storage tank that is used to vent the interior of the storage tank as the level of liquid in the storage tank rises and falls. Vent hole 26 has a cover (not depicted) that covers or shelters the vent hole 26 to keep water, dirt, and rain out of the interior of the storage tank. Cover on vent hole 26 is does not make an airtight or watertight seal with vent hole 26.

Main bottom panel 28 is a rigid rectangular planar member with an interior surface, an exterior surface, a left side, a front side, a right side, and a rear side.

Left bottom panel 30 is a rigid rectangular planar member with an interior surface, an exterior surface, a left side, a front side, a right side, and a rear side.

Lower left rear panel 32 is a rigid rectangular planar member with an interior surface, an exterior surface, a left side, a lower side, a right side, and an upper side.

Upper left rear panel 34 is a rigid rectangular planar member with an interior surface, an exterior surface, a left side, a lower side, a right side, and an upper side.

Left front diagonal panel 36 is a rigid rectangular planar member with an interior surface, an exterior surface, a left side, a front side, a right side, and a rear side.

Left rear diagonal panel 38 is a rigid rectangular planar member with an interior surface, an exterior surface, a left side, a front side, a right side, and a rear side.

Middle rear panel 40 is a rigid rectangular planar member with an interior surface, an exterior surface, a left side, a front side, a right side, and a rear side.

Middle rear panel 40 further comprises: a mount plate top flange 42; mount plate bottom flange 44; a mount plate left flange 50; and a mount plate right flange 52.

Mount plate top flange 42 is a rigid rectangular planar member with a longitudinal axis, a left side, a front side, a right side, and a rear side. The second side of mount plate top flange 42 is rigidly attached to the exterior surface of middle rear panel 40 with the longitudinal axis of mount plate top flange 42 parallel with and adjacent to the upper side of middle rear panel 40. Also, mount plate top flange is angled downward to yield a flange with a downward angle or a declining angle as depicted. This downward angle provides a pocket or ledge for the upper portion of the universal adaptor plate or quick attachment plate 134 on skid steer or track loader 120 to catch and lock into during attachment of the liquid storage tank that is reversibly rigidly attachable to the lift arms of a skid steer loader or track loader 5 to the lift arms 130 of the skid steer or track loader 120.

Mount plate bottom flange 44 is a rigid rectangular planar member with a longitudinal axis, a left side, an upper side, a right side, and a lower side. The second side of mount plate bottom flange 44 is rigidly attached to the exterior surface of middle rear panel 40 with the longitudinal axis of mount plate bottom flange 44 parallel with and adjacent to the lower side of middle rear panel 40. Also, mount plate bottom flange 44 is angled downward to yield a flange with a downward angle or a declining angle as depicted. This downward angle provides a mating surface at the proper angle for the lower portion of the universal adaptor plate or quick attachment plate 134 on skid steer or track loader 120 to catch and lock into during attachment of the liquid storage tank that is reversibly rigidly attachable to the lift arms of a skid steer loader or track loader 5 to the lift arms 130 of the skid steer or track loader 120.

Mount plate bottom flange 44 further comprises: a left slot or hole 46 and a right slot or hole 48.

Left slot or hole 46 is a circular or slotted hole in mount plate bottom flange 44 that is located adjacent to the left side of mount plate bottom flange 44.

Left slot or hole 46 functions to receive a first pin or rod from the universal adaptor plate or quick attachment plate 134 on skid steer or track loader 120 wherein the first pin or rod is locked into left slot or hole 46 to help rigidly attach the liquid storage tank that is reversibly rigidly attachable to the lift arms of a skid steer loader or track loader 5 to the lift arms of a skid steer loader or track loader 5 to the lift arms 130 of the skid steer or track loader 120.

Right slot or hole 48 is a circular or slotted hole in mount plate bottom flange 44 that is located adjacent to the right side of mount plate bottom flange 44.

Right slot or hole 48 functions to receive a second pin or rod from the universal adaptor plate or quick attachment plate 134 on skid steer or track loader 120 wherein the second pin or rod is locked into right slot or hole 48 to help rigidly attach the liquid storage tank that is reversibly rigidly attachable to the lift arms of a skid steer loader or track loader 5 to the lift arms of a skid steer loader or track loader 5 to the lift arms 130 of the skid steer or track loader 120.

Mount plate left flange 50 is a rigid rectangular planar member with a longitudinal axis, a left side, a front side, a right side, and a rear side. The second side of mount plate left flange 50 is rigidly attached to the exterior surface of middle rear panel 40 with the longitudinal axis of mount plate left flange 50 parallel with and adjacent to the left side of middle rear panel 40. The first side of mount plate left flange 50 is rigidly attached to the first side of mount plate bottom flange 44. The third side of mount plate left flange 50 is rigidly attached to the first side of mount plate top flange 42.

Mount plate right flange 52 is a rigid rectangular planar member with a longitudinal axis, a left side, a front side, a right side, and a rear side. The second side of mount plate right flange 52 is rigidly attached to the exterior surface of middle rear panel 40 with the longitudinal axis of mount plate right flange 52 parallel with and adjacent to the right side of middle rear panel 40. The first side of mount plate right flange 52 is rigidly attached to the third side of mount plate bottom flange 44. The third side of mount plate right flange 52 is rigidly attached to the third side of mount plate top flange 42. Together mount plate top flange 42, mount plate bottom flange 44, mount plate left flange 50, and mount plate right flange for a rectangular flange, as depicted, onto which the universal adaptor plate or quick attachment plate 134 on the skid steer or track loader 120 may reversibly rigidly attach thereto. As stated, the universal adaptor plate or quick attachment plate 134 on a skid steer or track loader 120 is universal or standard and therefore liquid storage tank that is reversibly rigidly attachable to the lift arms of a skid steer loader or track loader 5 is reversibly rigidly attachable to the universal adaptor plate or quick attachment plate 134 of any brand of skid steer or track loader 120.

Figure 11:
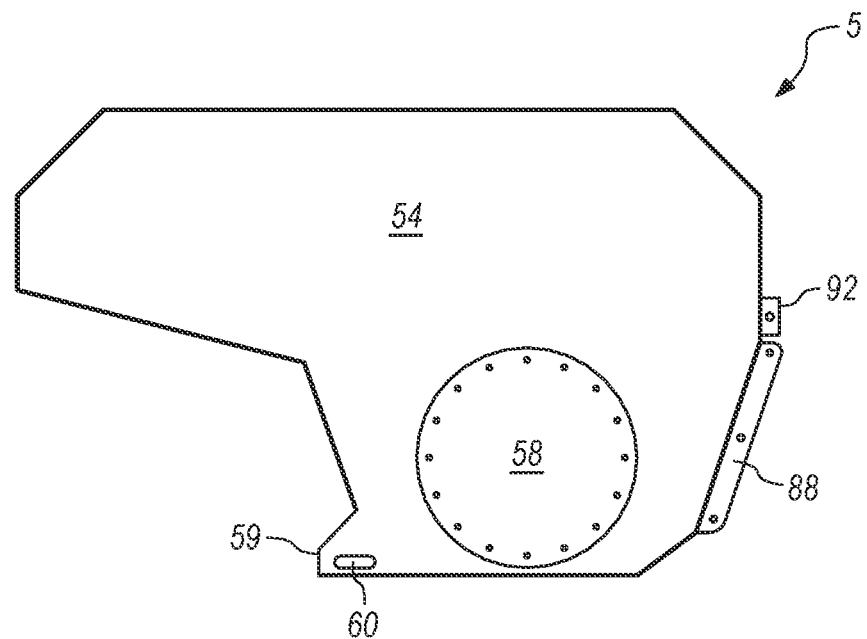
FIG. 11 is a right side elevation view of a 300 gallon size of liquid storage tank that is reversibly rigidly attachable to the lift arms of a skid steer loader or track loader.

Outer right side panel 54 is a rigid planar member that is winged-shaped. The winged-shaped panel has an extended portion or elongated portion that extends outwards, like the shape of a wing. Outer right side panel 54 has the shape of a left handed wing of a bird or an airplane as depicted in FIG. 11. The extended portion or elongated portion of outer right side panel 54 is the portion of the storage tank that extends rearwards and over the right tank tread or caterpillar track 138 of the skid steer or track loader 120. The positioning of this portion of the storage tank importantly relocates the center of gravity of the storage tank rearwards substantially, to a point that is behind or rearwards of the universal adaptor plate or quick attachment plate 134, and over top of the right tank tread or caterpillar track 138, to greatly improve the stability of the skid steer or track loader 120, even with a full load of liquid in the storage tank.

Outer right side panel 54 is a decagon or a ten-sided polygon. The decagon is irregular ten-sided polygon that forms the left handed wing shape. Outer right side panel 54 has an interior surface and an exterior surface. Outer right side panel 54 is the mirror image of outer left side panel 10. Outer right side panel 54 has a first side that is the horizontal lower side of outer right side panel 54. The first side of outer right side panel 54 is attached to the right side of main bottom panel 28 to form an airtight and watertight connection therebetween. The second side of outer right side panel 54 is adjacent to the first side of outer right side panel 54 moving counterclockwise around the outer right side panel 54. Second side of outer right side panel 54 forms an acute angle with the first side. Second side of outer right side panel 54 is attached to the right side of first front panel 84 to form an airtight and watertight connection therebetween. The third side of outer right side panel 54 is adjacent to the second side of outer left side panel 10 moving counterclockwise around the outer right side panel 54. Third side of outer right side panel 54 forms an acute angle with the second side. Third side of outer right side panel 54 is attached to the right side of the second front panel 86 to form an airtight and watertight connection therebetween. The fourth side of outer right side panel 54 is adjacent to the third side of outer right side panel 54 moving counterclockwise around the outer right side panel 54. Fourth side of outer right side panel 54 forms an acute angle with the third side. Fourth side is the vertical front side of outer right side panel 54. The fourth side of outer left side panel 10 is attached to the right side of the third front panel 90 to form an airtight and watertight connection therebetween. The fifth side of outer right side panel 54 is adjacent to the fourth side of outer right side panel 54 moving counterclockwise around the outer right side panel 54. Fifth side of outer right side panel 54 forms an acute angle with the fourth side. The fifth side of outer right side panel 54 is attached to the right side of right front diagonal panel 80 to form an airtight and watertight connection therebetween. The sixth side of outer right side panel 54 is adjacent to the fifth side of outer right side panel 54 moving counterclockwise around the outer right side panel 54. Sixth side of outer right side panel 54 forms an acute angle with the fifth side. Sixth side is the horizontal upper side of outer right side panel 54. The sixth side represents the leading edge of the left wing shape of outer right side panel 54. The sixth side is the longest side of outer right side panel 54 and is about 1.25-5 times longer than the first side or lower side. The sixth side of outer right side panel 54 is attached to the right side of right top panel 66 to form an airtight and watertight connection therebetween. The seventh side of outer right side panel 54 is adjacent to the sixth side of outer right side panel 54 moving counterclockwise around the outer right side panel 54. Seventh side of outer right side panel 54 forms an acute angle with the sixth side. The seventh side of outer right side panel 54 is attached to the right side of right rear diagonal panel 82 to form an airtight and watertight connection therebetween. The eighth side of outer right side panel 54 is adjacent to the seventh side of outer right side panel 54 moving counterclockwise around the outer right side panel 54. Eighth side of outer right side panel 54 forms an acute angle with the seventh side. Eighth side of outer right side panel 54 is the vertical rear side of outer right side panel 54. The eighth side represents the tip of the left wing shape of the outer right side panel 54. The eighth side of outer right side panel 54 is attached to the right side of upper right rear panel 78 to form an airtight and watertight connection therebetween. The ninth side of outer right side panel 54 is adjacent to the eighth side of outer right side panel 54 moving counterclockwise around the outer right side panel 54. Ninth side of outer right side panel 54 forms an acute angle with the eighth side. The ninth side represents the trailing edge of the left wing shape of the outer right side panel 54. The ninth side is as long or longer than the first side of outer right side panel 54. The ninth side of outer right side panel 54 is attached to the right side of right bottom panel 74 to form an airtight and watertight connection therebetween. The tenth side of outer right side panel 54 is adjacent to the ninth side of outer right side panel 54 moving counterclockwise around the outer right side panel 54. Tenth side of outer right side panel 54 forms an acute angle with the ninth side. The tenth side of outer right side panel 54 is attached to the right side of lower left rear panel 32 to form an airtight and watertight connection therebetween.

Outer right side panel 54 may further comprise: an access port 56 and an access port cover 58. Access port 56 is a circular, triangular, square, or rectangular hole or void in outer right side panel 54. Access port 56 functions to provide access or an access hole into the interior of the storage tank to clean, inspect, and repair the interior of the storage tank. Access port cover 58 is a rigid planar member in the same shape as access port 56. Access port cover 58 is a cover or lid that is reversibly attachable to access port 56 that makes an airtight and watertight connection with access port 56 when attached to access port 56. In best mode this attachment is done with fasteners located around the full perimeter of access port cover 58.

The tenth side of outer right side panel 54 may further comprise: a dog ear 59 and a slot or hole 60. Dog ear 59 is an ear-shaped extension or protrusion extending outwards from the tenth side of outer right side panel 54. Dog ear 59 protrudes about 3-10 inches outward. Slot or hole 60 is a circular hole or slotted hole on dog ear 59. Dog ear 59 and slot or hole 60 function to provide a tie down point or hook to help attach or hook peripheral equipment to the skid steer or track loader 120. Dog ear 15 and slot or hole provides a stable hook point to attach a plow, bucket, blade, or other equipment to the skid steer or track loader 120. Dog ear 15 and slot or hole are not required for proper functioning of the storage tank and are added only as optional upgrades.

Inner right side panel 62 is a rigid planar member that is a mirror image of outer right side panel 54 except with a rectangular notch cut out. The rectangular cut-out represents the portion of the storage tank underneath the main top panel 72 or the center cavity 9 of the storage tank that connects the left cavity 7 of the storage tank to the right cavity 8 of the storage tank. Like outer right side panel 54, inner right side panel 62 has the shape of the left handed wing of a bird or an airplane as depicted. The extended portion or elongated portion of inner right side panel 62 is the portion of the storage tank that extends rearwards and over the right tank tread or caterpillar track 138 of the skid steer or track loader 120. The positioning of this portion of the storage tank importantly relocates the center of gravity of the storage tank rearwards substantially, to a point that is behind or rearwards of the universal adaptor plate or quick attachment plate 134, and over top of the right tank tread or caterpillar track 138, to greatly improve the stability of the skid steer or track loader 120, even with a full load of liquid in the storage tank.

Inner right side panel 62 is a decagon or a ten-sided polygon. The decagon is irregular ten-sided polygon that forms the left handed wing shape with the rectangular notch cut out. Inner right side panel 62 has an interior surface and an exterior surface. Inner right side panel 62 has a first side that corresponds and matches with the first side of outer right side panel 54 except for the portion that is cut out by the rectangular notch cut out. Inner right side panel 62 has a second side that is the vertical side of the rectangular notch cut out. Inner right side panel 62 has a third side that is the horizontal side of the rectangular notch cut out. Inner right side panel 62 has a fourth side that is that corresponds and matches with the fourth side of outer right side panel 54. Inner right side panel 62 has a fifth side that is that corresponds and matches with the fifth side of outer right side panel 54. Inner right side panel 62 has a sixth side that is that corresponds and matches with the sixth side of outer right side panel 54. Inner right side panel 62 has a seventh side that is that corresponds and matches with the seventh side of outer right side panel 54. Inner right side panel 62 has an eighth side that is that corresponds and matches with the eighth side of outer right side panel 54. Inner right side panel 62 has a ninth side that is that corresponds and matches with the ninth side of outer right side panel 54. Inner right side panel 62 has a tenth side that is that corresponds and matches with the tenth side of outer right side panel 54.

The tenth side of inner right side panel 62 may further comprise: a dog ear 63 and a slot or hole 64. Dog ear 63 is an ear-shaped extension or protrusion extending outwards from the tenth side of inner right side panel 62. Dog ear 63 protrudes about 3-10 inches outward. Slot or hole 64 is a circular hole or slotted hole on dog ear 63. Dog ear 63 and slot or hole 64 function to provide a tie down point or hook to help attach or hook peripheral equipment to the skid steer or track loader 120. Dog ear 63 and slot or hole 64 provides a stable hook point to attach a plow, bucket, blade, or other equipment to the skid steer or track loader 120. Dog ear 63 and slot or hole 64 are not required for proper functioning of the storage tank and are added only as optional upgrades.

Right top panel 66 is a rigid rectangular planar member with an interior surface, an exterior surface, a longitudinal axis, a left side, a front side, a right side, and a rear side.

Right top panel 66 may further comprise: a fill hole 68 and a vent hole 70. Fill hole 68 is a circular, triangular, square, or rectangular hole or void in right top panel 66. Fill hole 68 functions to provide a port to the interior of the storage tank that is used to fill the storage tank with a liquid such as water, foam, diesel fuel, or gasoline. Fill hole 68 has a cover or lid (not depicted) that provides and airtight and water tight seal when attached to the fill hole 68. Vent hole 70 is a circular, triangular, square, or rectangular hole or void in right top panel 66. Vent hole 26 functions to provide a port to the interior of the storage tank that is used to vent the interior of the storage tank as the level of liquid in the storage tank rises and falls. Vent hole 70 has a cover (not depicted) that covers or shelters the vent hole 70 to keep water, dirt, and rain out of the interior of the storage tank. Cover on vent hole 70 is does not make an airtight or watertight seal with vent hole 70.

Main top panel 72 is a rigid rectangular planar member with an interior surface, an exterior surface, a left side, a front side, a right side, and a rear side.

Right bottom panel 74 is a rigid rectangular planar member with an interior surface, an exterior surface, a left side, a front side, a right side, and a rear side.

Lower right rear panel 76 is a rigid rectangular planar member with an interior surface, an exterior surface, a left side, a lower side, a right side, and an upper side.

Upper right rear panel 78 is a rigid rectangular planar member with an interior surface, an exterior surface, a left side, a lower side, a right side, and an upper side.

Right front diagonal panel 80 is a rigid rectangular planar member with an interior surface, an exterior surface, a left side, a front side, a right side, and a rear side.

Right rear diagonal panel 82 is a rigid rectangular planar member with an interior surface, an exterior surface, a left side, a front side, a right side, and a rear side.

First front panel 84 is a rigid rectangular planar member with an interior surface, an exterior surface, a left side, an upper side, a right side, and a lower side.

Second front panel 86 is a rigid rectangular planar member with an interior surface, an exterior surface, a left side, an upper side, a right side, and a lower side.

Second front panel 86 may further comprise: a left flange 87 and a right flange 88.

Left flange 87 is a rigid rectangular planar member with a longitudinal axis, left surface, a right surface, a left side, a front side, a right side, and a rear side. The third side of left flange 87 is rigidly attached to the outer surface of second front panel 86, adjacent to the left side of second front panel 86, with the longitudinal axis of left flange 87 perpendicular to the upper and lower sides of second front panel 86. Left flange 87 may have a plurality of circular holes or slots therethrough to function as tie down points or hooks to help attach peripheral equipment, such as snow plow, blade, bucket, to the skid steer or track loader 120.

Right flange 88 is a rigid rectangular planar member with a longitudinal axis, left surface, a right surface, a left side, a front side, a right side, and a rear side. The third side of right flange 88 is rigidly attached to the outer surface of second front panel 86, adjacent to the right side of second front panel 86, with the longitudinal axis of right flange 88 perpendicular to the upper and lower sides of second front panel 86. Right flange 88 may have a plurality of circular holes or slots therethrough to function as tie down points or hooks to help attach peripheral equipment, such as a snow plow, blade, bucket, to the skid steer or track loader 120.

Third front panel 90 is a rigid rectangular planar member with a smaller rectangular cut-out along the upper side to yield a "blocked" U-shaped member with an interior surface, an exterior surface, a first side, a second side, a third side, a fourth side, a fifth side, a sixth side, a seventh side, and an eighth side. The eighth sides form the blocked U-shape that is a U-shape with all right angles.

Third front panel 90 may further comprise: a left receiver 91 and a right receiver 92.

Left receiver 91 is a trailer hitch receiver or coupling. Left receiver 91 is a rigid square tubular member with longitudinal axis, an open end, and a closed end. Left receiver 91 is attached to third front panel 90 with the longitudinal axis of left receiver perpendicular to the plane of third front panel 90. The closed end of left receiver 91 is located in the interior of storage tank. The open end of left receiver 91 is exterior to the storage tank as depicted. The closed end of left receiver 91 is airtight and watertight. The attachment of left receiver 91 to the third front panel 90 is airtight and watertight. Left receiver 91 may have two circular holes in its tubular sides adjacent to the open end as depicted.

Right receiver 92 is a trailer hitch receiver or coupling. Right receiver 92 is a rigid square tubular member with longitudinal axis, an open end, and a closed end. Right receiver 92 is attached to third front panel 90 with the longitudinal axis of left receiver perpendicular to the plane of third front panel 90. The closed end of right receiver 92 is located in the interior of storage tank. The open end of right receiver 92 is exterior to the storage tank as depicted. The closed end of right receiver 92 is airtight and watertight. The attachment of right receiver 92 to the third front panel 90 is airtight and watertight. Right receiver 91 may have two circular holes in its tubular sides adjacent to the open end as depicted. Left and right receivers 91,92 function to receive mounting hardware from a snow plow, blade, bucket or peripheral equipment in order to help attach peripheral equipment to the skid steer or track loader 120.

The left side of left top panel 22 is attached to the sixth side of outer left side panel 10 to form an airtight and watertight connection therebetween. The front side of left top panel 22 is attached to the upper side of left front diagonal panel 36 to form an airtight and watertight connection therebetween. The right side of left top panel 22 is attached to the sixth side of inner left side panel 18 to form an airtight and watertight connection therebetween. The rear side of left top panel 22 is attached to the upper side of left rear diagonal panel 38 to form an airtight and watertight connection therebetween.

The left side of main bottom panel 28 is attached to the first side of outer left side panel 10 to form an airtight and watertight connection therebetween. The rear side of main bottom panel 28 is attached to the lower side of middle rear panel 40 to form an airtight and watertight connection therebetween. The right side of main bottom panel 28 is attached to the lower side of outer right side panel 54 to form an airtight and watertight connection therebetween. The front side of main bottom panel 28 is attached to the lower side of first front panel 84 to form an airtight and watertight connection therebetween.

The left side of left bottom panel 30 is attached to the ninth side of outer left side panel 10 to form an airtight and watertight connection therebetween. The front side of left bottom panel 30 is attached to the upper side of lower left rear panel 32 to form an airtight and watertight connection therebetween. The right side of left bottom panel 30 is attached to the ninth side of inner left side panel 18 to form an airtight and watertight connection therebetween. The rear side of left bottom panel 30 is attached to the lower side of upper left rear panel 34 to form an airtight and watertight connection therebetween.

The left side of lower left rear panel 32 is attached to the tenth side of outer left side panel 10 to form an airtight and watertight connection therebetween. The lower side of lower left rear panel 32 is attached to the rear side of main bottom panel 28 to form an airtight and watertight connection therebetween. The right side of lower left rear panel 32 is attached to the tenth side of inner left side panel 18 to form an airtight and watertight connection therebetween. The upper side of lower left rear panel 32 is attached to the lower side of left bottom panel 30 to form an airtight and watertight connection therebetween.

The left side of upper left rear panel 34 is attached to the eighth side of outer left side panel 10 to form an airtight and watertight connection therebetween. The upper side of upper left rear panel 34 is attached to the lower side of left rear diagonal panel 38 to form an airtight and watertight connection therebetween. The right side of upper left rear panel 34 is attached to the eighth side of inner left side panel 18 to form an airtight and watertight connection therebetween. The lower side of upper left rear panel 34 is attached to the rear side of left bottom panel 30 to form an airtight and watertight connection therebetween.

The left side of left front diagonal panel 36 is attached to the fifth side of outer left side panel 10 to form an airtight and watertight connection therebetween. The front side of left front diagonal panel 36 is attached to the seventh side of third front panel 90 to form an airtight and watertight connection therebetween. The right side of left front diagonal panel 36 is attached to the fifth side of inner left side panel 18 to form an airtight and watertight connection therebetween. The rear side of left front diagonal panel 36 is attached to the front side of left top panel 22 to form an airtight and watertight connection therebetween.

The left side of left rear diagonal panel 38 is attached to the seventh side of outer left side panel 10 to form an airtight and watertight connection therebetween. The front side of left rear diagonal panel 38 is attached to the rear side of left top panel 22 to form an airtight and watertight connection therebetween. The right side of left rear diagonal panel 38 is attached to the seventh side of inner left side panel 18 to form an airtight and watertight connection therebetween. The rear side of left rear diagonal panel 38 is attached to the upper side of upper left rear panel 34 to form an airtight and watertight connection therebetween.

The left side of middle rear panel 40 is attached to the seventh side of outer left side panel 10 to form an airtight and watertight connection therebetween. The upper side of middle rear panel 40 is attached to the rear side of main top panel 72 to form an airtight and watertight connection therebetween. The right side of middle rear panel 40 is attached to the seventh side of inner left side panel 18 to form an airtight and watertight connection therebetween. The lower side of middle rear panel 40 is attached to the rear side of main bottom panel 28 to form an airtight and watertight connection therebetween.

The right side of right top panel 66 is attached to the sixth side of outer right side panel 54 to form an airtight and watertight connection therebetween. The front side of right top panel 66 is attached to the upper side of right front diagonal panel 80 to form an airtight and watertight connection therebetween. The left side of right top panel 66 is attached to the sixth side of inner right side panel 62 to form an airtight and watertight connection therebetween. The rear side of right top panel 66 is attached to the upper side of right rear diagonal panel 82 to form an airtight and watertight connection therebetween.

The front side of main top panel 72 is attached to the fifth side of third front panel 90 to form an airtight and watertight connection therebetween. The left side of main top panel 72 is attached to the third side of inner left side panel 18 to form an airtight and watertight connection therebetween. The rear side of main top panel 72 is attached to the upper side of middle rear panel 40 to form an airtight and watertight connection therebetween. The right side of main top panel 72 is attached to the third side of inner right side panel 62 to form an airtight and watertight connection therebetween.

The right side of right bottom panel 74 is attached to the ninth side of outer right side panel 54 to form an airtight and watertight connection therebetween. The front side of right bottom panel 74 is attached to the upper side of lower right rear panel 76 to form an airtight and watertight connection therebetween. The left side of right bottom panel 74 is attached to the ninth side of inner right side panel 62 to form an airtight and watertight connection therebetween. The rear side of right bottom panel 74 is attached to the lower side of upper right rear panel 78 to form an airtight and watertight connection therebetween.

The right side of lower right rear panel 76 is attached to the tenth side of outer right side panel 54 to form an airtight and watertight connection therebetween. The lower side of lower right rear panel 76 is attached to the rear side of main bottom panel 28 to form an airtight and watertight connection therebetween. The left side of lower right rear panel 76 is attached to the tenth side of inner right side panel 62 to form an airtight and watertight connection therebetween. The upper side of lower right rear panel 76 is attached to the lower side of right bottom panel 74 to form an airtight and watertight connection therebetween.

The right side of upper right rear panel 78 is attached to the eighth side of outer right side panel 54 to form an airtight and watertight connection therebetween. The upper side of upper right rear panel 78 is attached to the lower side of right rear diagonal panel 82 to form an airtight and watertight connection therebetween. The left side of upper right rear panel 78 is attached to the eighth side of inner right side panel 62 to form an airtight and watertight connection therebetween. The lower side of upper right rear panel 78 is attached to the rear side of right bottom panel 74 to form an airtight and watertight connection therebetween.

The right side of right front diagonal panel 80 is attached to the fifth side of outer right side panel 54 to form an airtight and watertight connection therebetween. The front side of right front diagonal panel 80 is attached to the third side of third front panel 90 to form an airtight and watertight connection therebetween. The left side of right front diagonal panel 80 is attached to the fifth side of inner right side panel 62 to form an airtight and watertight connection therebetween. The rear side of right front diagonal panel 80 is attached to the front side of right top panel 66 to form an airtight and watertight connection therebetween.

The right side of right rear diagonal panel 82 is attached to the seventh side of outer right side panel 54 to form an airtight and watertight connection therebetween. The front side of right rear diagonal panel 82 is attached to the rear side of right top panel 66 to form an airtight and watertight connection therebetween. The left side of right rear diagonal panel 82 is attached to the seventh side of inner right side panel 62 to form an airtight and watertight connection therebetween. The rear side of right rear diagonal panel 82 is attached to the upper side of upper right rear panel 78 to form an airtight and watertight connection therebetween.

The left side of first front panel 84 is attached to the second side of outer left side panel 10 to form an airtight and watertight connection therebetween. The upper side of first front panel 84 is attached to the lower side of second front panel 86 to form an airtight and watertight connection therebetween. The right side of first front panel 84 is attached to the second side of outer right side panel 54 to form an airtight and watertight connection therebetween. The lower side of first front panel 84 is attached to the front side of main bottom panel 28 to form an airtight and watertight connection therebetween.

The left side of second front panel 86 is attached to the third side of outer left side panel 10 to form an airtight and watertight connection therebetween. The upper side of second front panel 86 is attached to the lower side of third front panel 90 to form an airtight and watertight connection therebetween. The right side of second front panel 86 is attached to the third side of outer right side panel 54 to form an airtight and watertight connection therebetween. The lower side of second front panel 86 is attached to the upper side of first front panel 84 to form an airtight and watertight connection therebetween.

The first side of third front panel 90 is attached to the upper side of second front panel 86 to form an airtight and watertight connection therebetween. The second side of third front panel 90 is attached to the fourth side of outer right side panel 54 to form an airtight and watertight connection therebetween. The third side of third front panel 90 is attached to the front side of right front diagonal panel 80 to form an airtight and watertight connection. The fourth side of third front panel 90 is attached to the fourth side of inner right side panel 62 to form an airtight and watertight connection therebetween. The fifth side of third front panel 90 is attached to the front side of main top panel 72 to form an airtight and watertight connection therebetween. The sixth side of third front panel 90 is attached to the fourth side of inner left side panel 18 to form an airtight and watertight connection therebetween. The seventh side of third front panel 90 is attached to the front side of left front diagonal panel 36 to form an airtight and watertight connection therebetween. The eighth side of third front panel 90 is attached to the fourth side of outer left side panel 10 to form an airtight and watertight connection therebetween.

Thus, the above items and components are attached together to form a watertight chamber, tank, or container that holds at least 300 gallons of liquid. Of course, all corners or points where three panels meet are attached and sealed to form an airtight and watertight connection to yield a watertight chamber, tank, or container that holds at least 300 gallons of liquid. In best mode, the storage tank holds 300 gallons. The 300 gallon mode or embodiment of liquid storage tank that is reversibly rigidly attachable to the lift arms of a skid steer loader or track loader 5 is depicted in mode in FIGS. 7-14. In another embodiment, storage tank holds 500 gallons. The 500 gallon mode or embodiment of liquid storage tank that is reversibly rigidly attachable to the lift arms of a skid steer loader or track loader 5 is depicted in FIGS. 16-23.

Liquid storage tank that is reversibly rigidly attachable to the lift arms of a skid steer loader or track loader 5 may further comprise: a first retaining wall 94 and a second retaining wall 96.

First retaining wall 94 is a is a rigid rectangular planar member with a left side, an upper side, a right side, and a lower side. The lower side of first retaining wall 94 is attached to seam between the fifth side of third front panel 90 and the front side of main top panel 72. The left side of first retaining wall 94 is attached to the seam between the sixth side of third front panel 90 and the fourth side of inner left side panel 18. The right side of first retaining wall 94 is attached to the seam between the fourth side of third front panel 90 and the fourth side of inner right side panel 62.

Second retaining wall 96 is a is a rigid rectangular planar member with a left side, an upper side, a right side, and a lower side. The lower side of second retaining wall 96 is attached to the seam between upper side of middle rear panel 40 and the rear side of main top panel 72. The left side of second retaining wall 96 is attached to the outer surface of side of inner left side panel 18. The right side of second retaining wall 96 is attached to the outer surface of inner right side panel 62. First and second retaining walls 94,96 function to help retain equipment, tools, or a person on top of main top panel 72, which together act as a storage bed or cargo area for the liquid storage tank that is reversibly rigidly attachable to the lift arms of a skid steer loader or track loader 5.

Liquid storage tank that is reversibly rigidly attachable to the lift arms of a skid steer loader or track loader 5 may further comprise: a left bar stand 97 and a right bar stand 98. Left bar stand 97 is an angled length of rigid tubular material or an angled piece of bar that is shaped to an angle of about 90-140 degrees. Right bar stand 98 is an angled length of rigid tubular material or an angled piece of bar that is shaped to an angle of about 90-140 degrees. Left and right bar stands 97,98 function to hold the storage tank up and prevent the storage tank from falling over when not attached to a skid steer or track loader 120 and just sitting on the ground by itself. When the storage tank is attached to the skid steer or track loader 120, left and right bar stands 97,98 also function as a safety guardrail to keep things out the space between the storage tank and the tracks as the tank could be lowered and crush things in this space. This mode or embodiment is depicted in FIGS. 16-23.

Outer left side panel 10 may optionally have a left horizontal brake or dimple 11. Left horizontal brake or dimple 11 is horizontal bead, bend, or brake in outer left side panel 10 to render the panel three dimensional. Left horizontal brake or dimple 11 is horizontal channel or rectangular trough running across the entire outer surface of outer left side panel 10. Left horizontal brake or dimple 11 functions to add strength and rigidity to the outer surface of outer left side panel 10. This mode or embodiment is depicted in FIGS. 16-23.

Outer right side panel 54 may optionally have a right horizontal brake or dimple 55. Right horizontal brake or dimple 55 is horizontal bead, bend, or brake in outer right side panel 54 to render the panel three dimensional. Right horizontal brake or dimple 55 is horizontal channel or rectangular trough running across the entire outer surface of outer right side panel 54. Right horizontal brake or dimple 55 functions to add strength and rigidity to the outer surface of outer right side panel 54. This mode or embodiment is depicted in FIGS. 16-23.

Left top panel 22 may optionally be corrugated with two brakes or bends to yield a three-panel or three-plane rigid member. Each of the two brakes or bends is perpendicular to the longitudinal axis of left top panel 22. The breaking or dividing up of left top panel 22 into three panels adds strength and rigidity to the left top panel 22. This mode or embodiment is depicted in FIGS. 16-23.

Right top panel 66 may optionally be corrugated with to brakes or bends to yield a three-panel or three-plane rigid member. Each of the two brakes or bends is perpendicular to the longitudinal axis of right top panel 66. The breaking or dividing up of right top panel 66 three panels adds strength and rigidity two the right top panel 66. This mode or embodiment is depicted in FIGS. 16-23.

Figure 10:
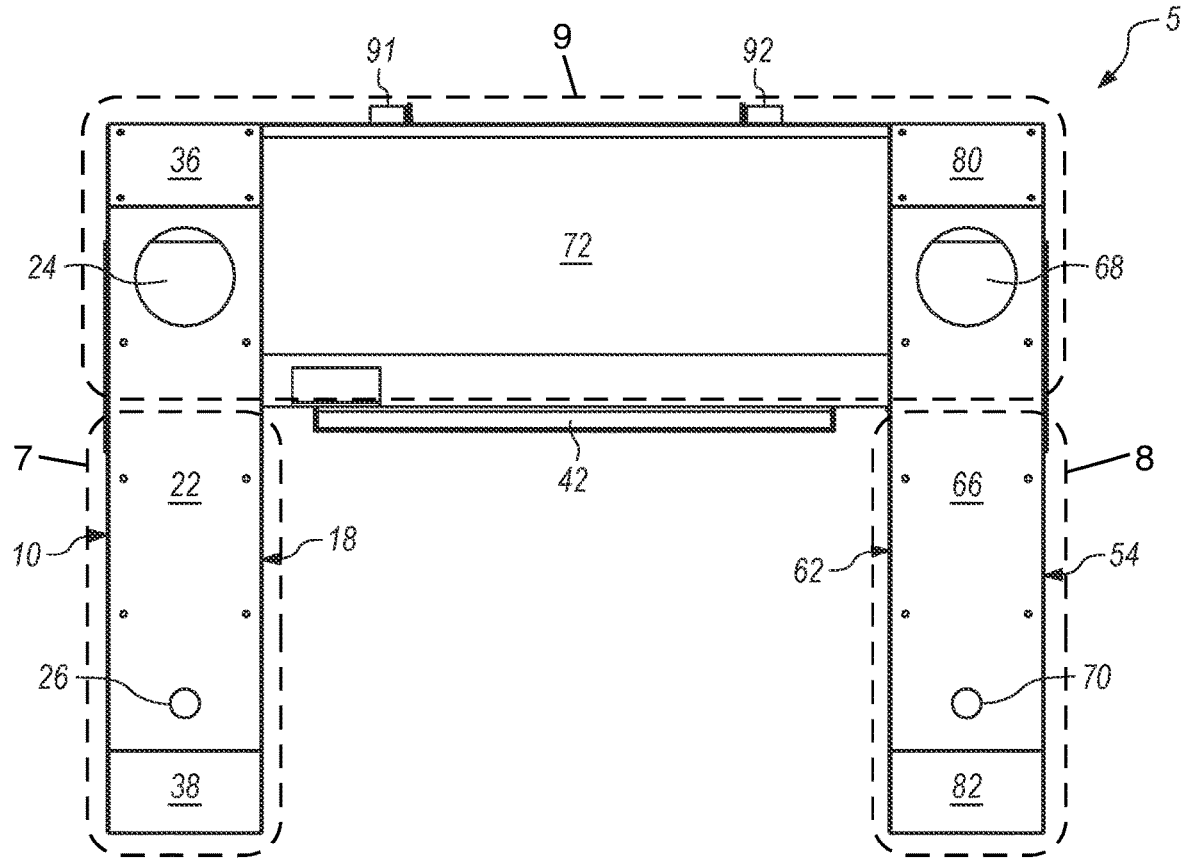
FIG. 10 is a top plan view of a 300 gallon size of liquid storage tank that is reversibly rigidly attachable to the lift arms of a skid steer loader or track loader.
Figure 19:
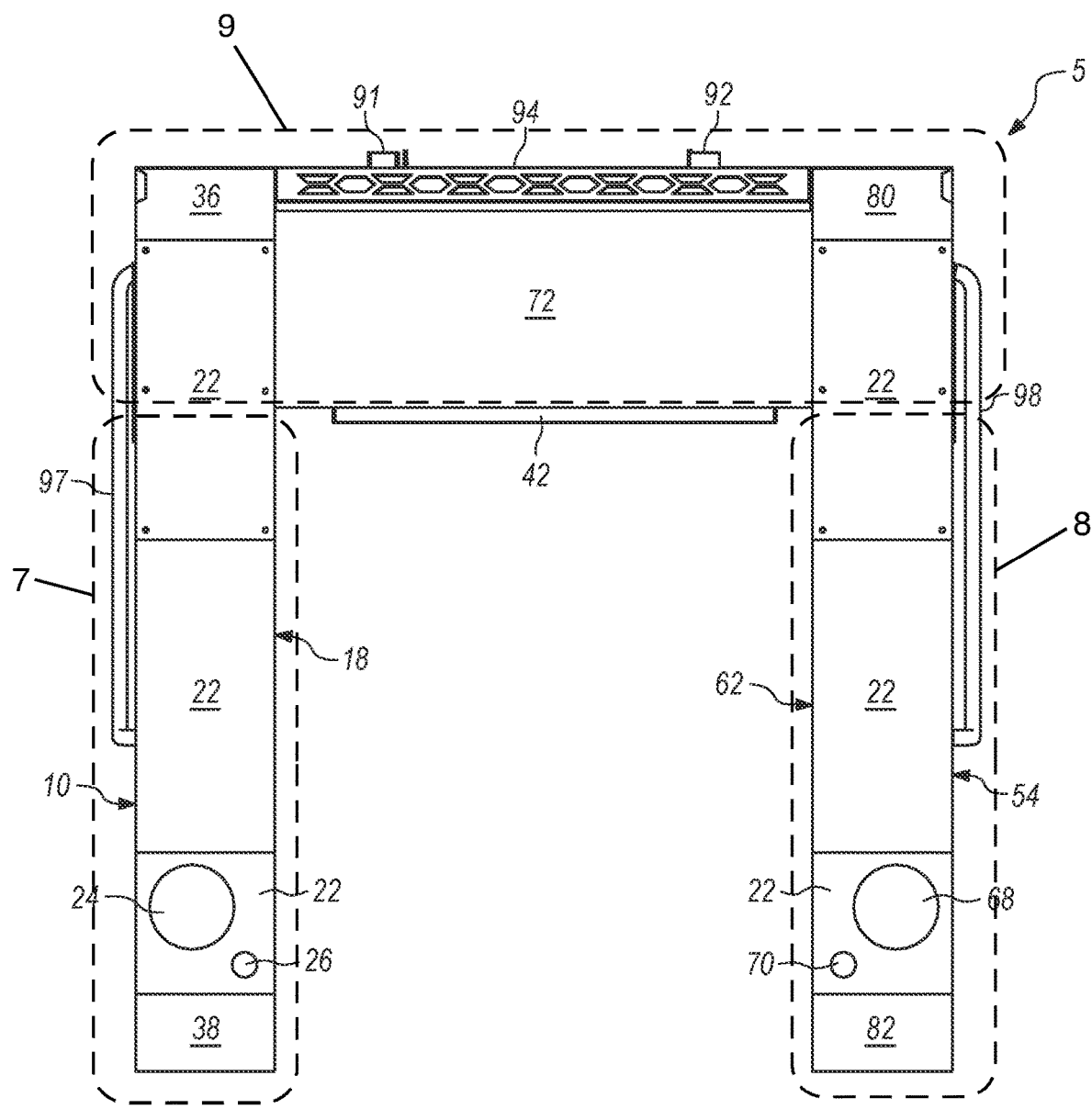
FIG. 19 is a top plan view of a 500 gallon size of liquid storage tank that is reversibly rigidly attachable to the lift arms of a skid steer loader or track loader.
Figure 20:
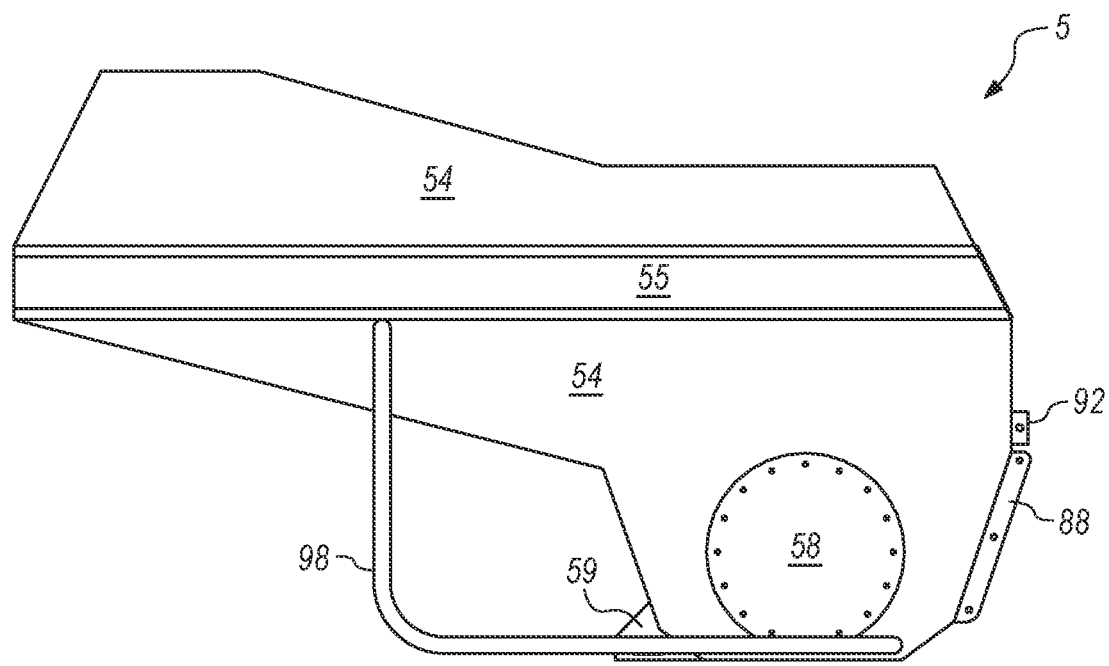
FIG. 20 is a right side elevation view of a 500 gallon size of liquid storage tank that is reversibly rigidly attachable to the lift arms of a skid steer loader or track loader.
Figure 21:
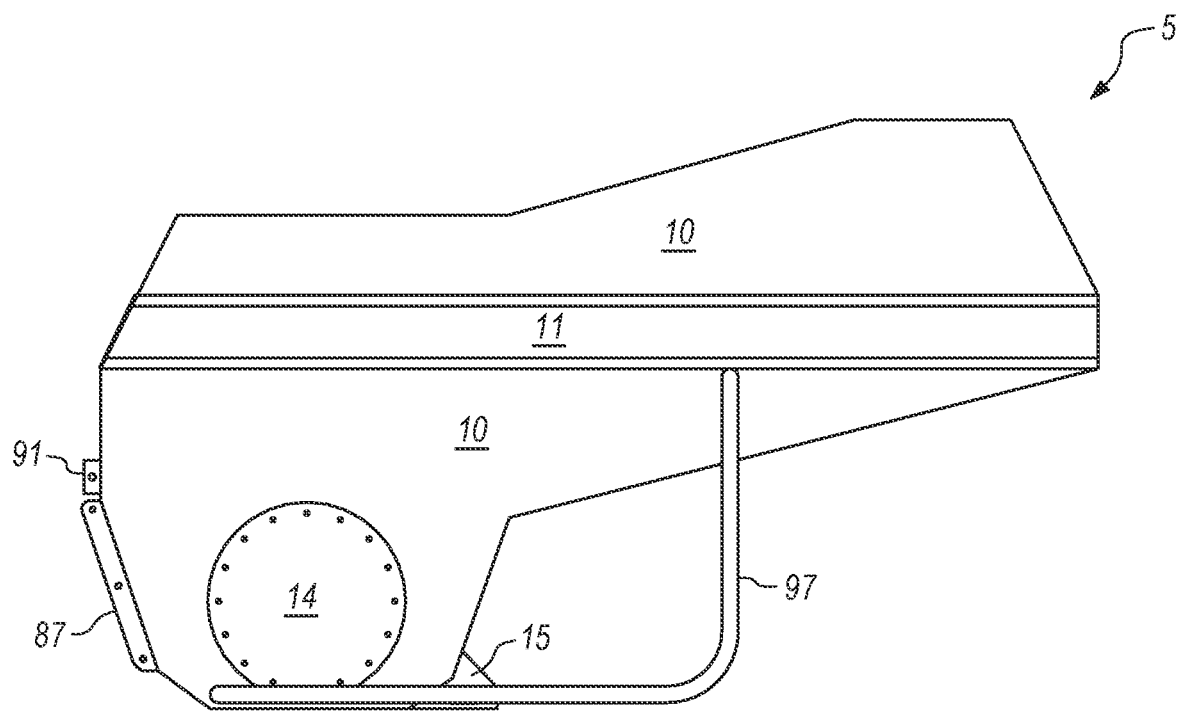
FIG. 21 is a left side elevation view of a 500 gallon size of liquid storage tank that is reversibly rigidly attachable to the lift arms of a skid steer loader or track loader.
Figure 22:
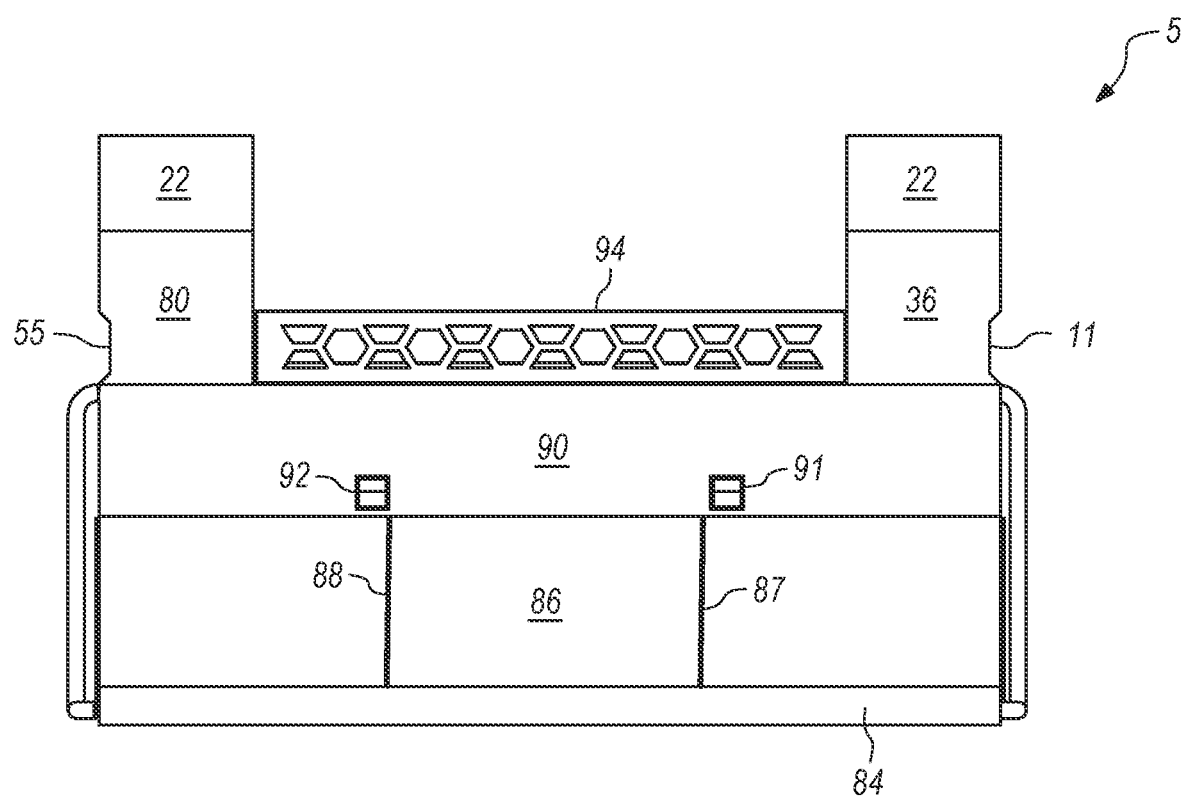
FIG. 22 is a front elevation view of a 500 gallon size of liquid storage tank that is reversibly rigidly attachable to the lift arms of a skid steer loader or track loader.
Figure 23:
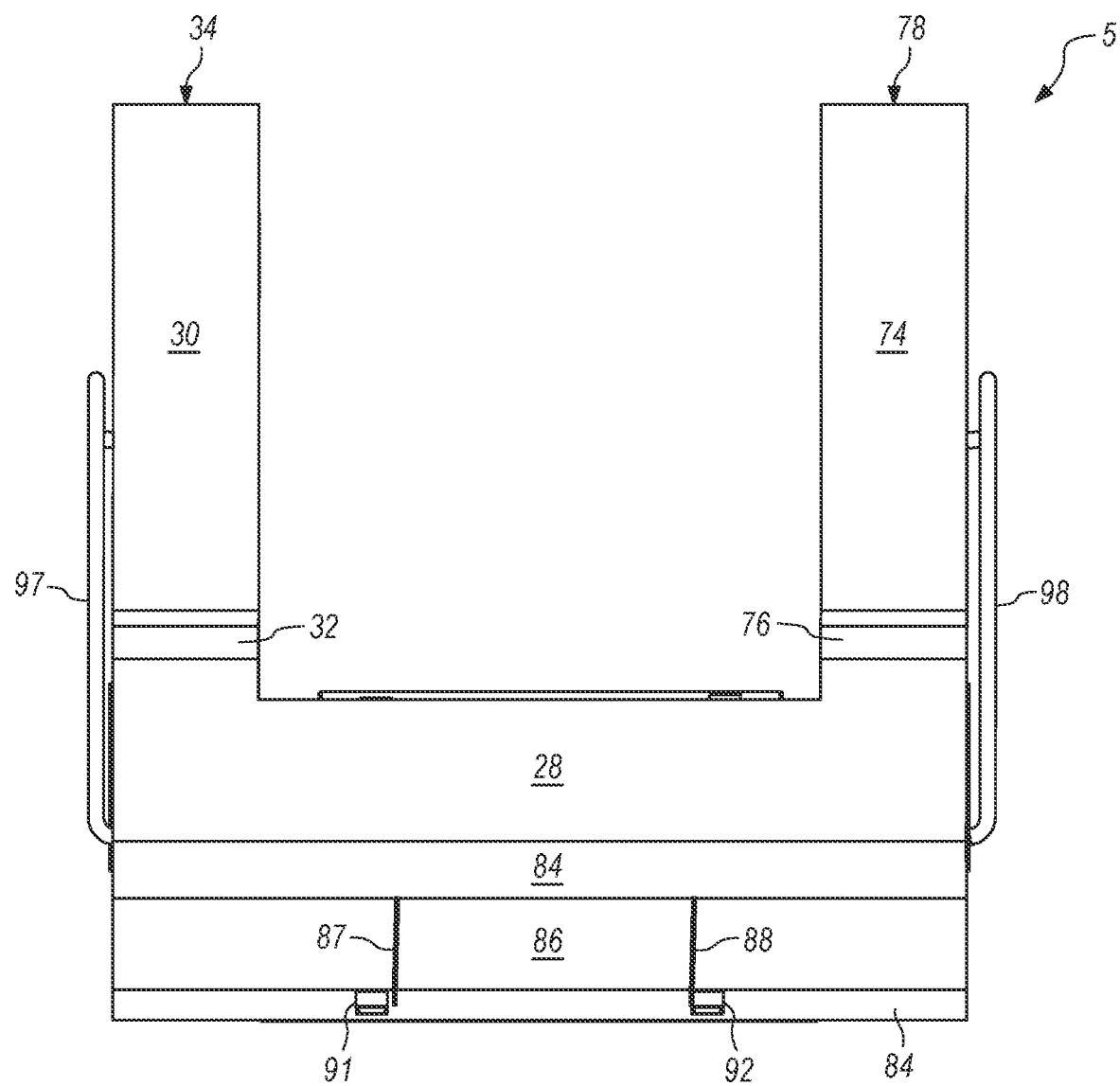
FIG. 23 is a bottom plan view of a 500 gallon size of liquid storage tank that is reversibly rigidly attachable to the lift arms of a skid steer loader or track loader.

With all embodiments, at least thirty percent of the storage capacity of the storage tank lies or is located behind the universal adaptor plate or quick attachment plate 134 of the skid steer or track loader 120 when the lift arms 130 of the skid steer or track loader 120 are down and universal adaptor plate or quick attachment plate 134 is generally vertical or upright. This occurs because the left cavity 7 and the right cavity 8 are both located behind the universal adaptor plate or quick attachment plate 134 as can be seen in FIGS. 10 and 19 wherein these figures depict the plane of the universal adaptor plate or quick attachment plate.

All the components detailed above may be made of any known material such as: metal, steel, aluminum, polymer, plastic, composite, wood, fiberglass, ceramic, carbon fiber, or any other known material. In best mode, the components are made of steel.

All attachments detailed above may be accomplished by any known means such as: brake bending, pressed seam, weld, solder, glue, epoxy, adhesive, bolts, screws, rivets, clips, snaps, pins, or fasteners. In best mode, attachments are accomplished by welding.

Figure 15:
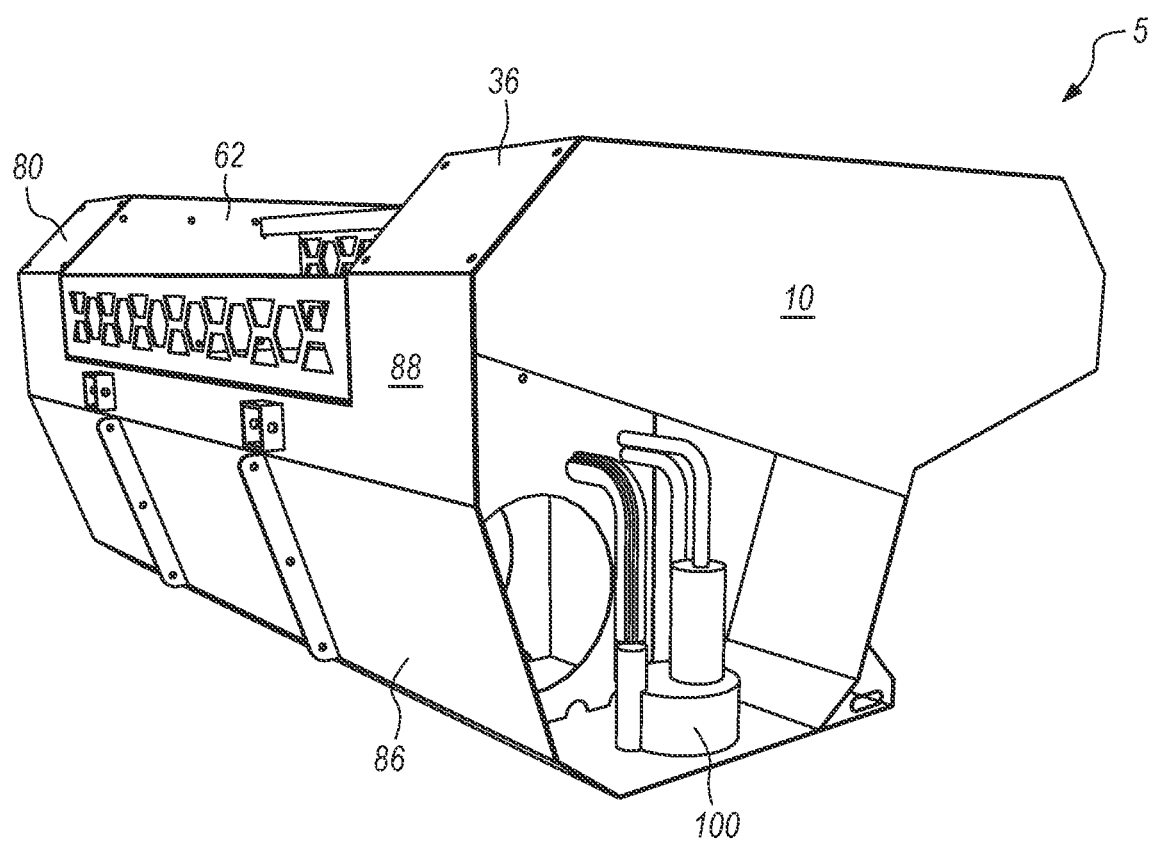
FIG. 15 is a cut-away perspective view of a 300 gallon size of liquid storage tank that is reversibly rigidly attachable to the lift arms of a skid steer loader or track loader depicting the hydraulic water pump located in the interior of storage tank.
Figure 16:
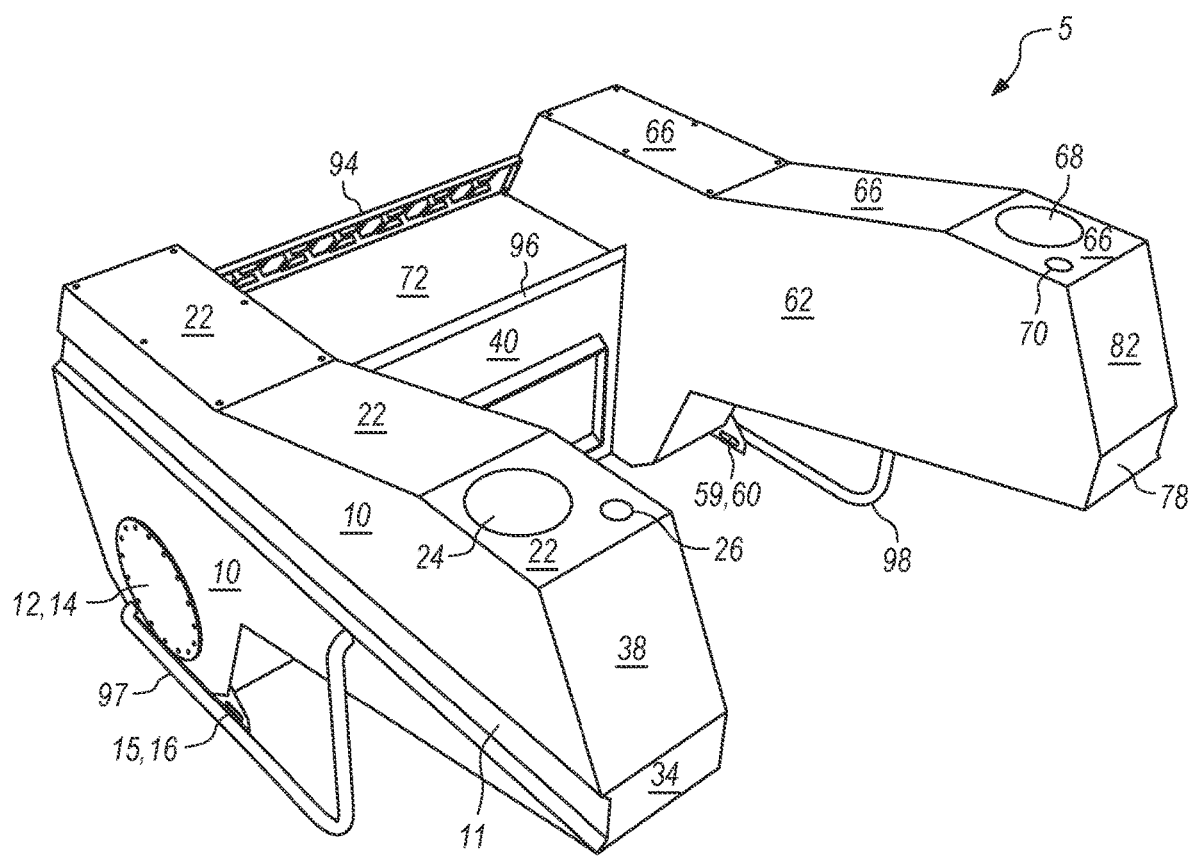
FIG. 16 is a perspective view of a 500 gallon size of liquid storage tank that is reversibly rigidly attachable to the lift arms of a skid steer loader or track loader.
Figure 17:
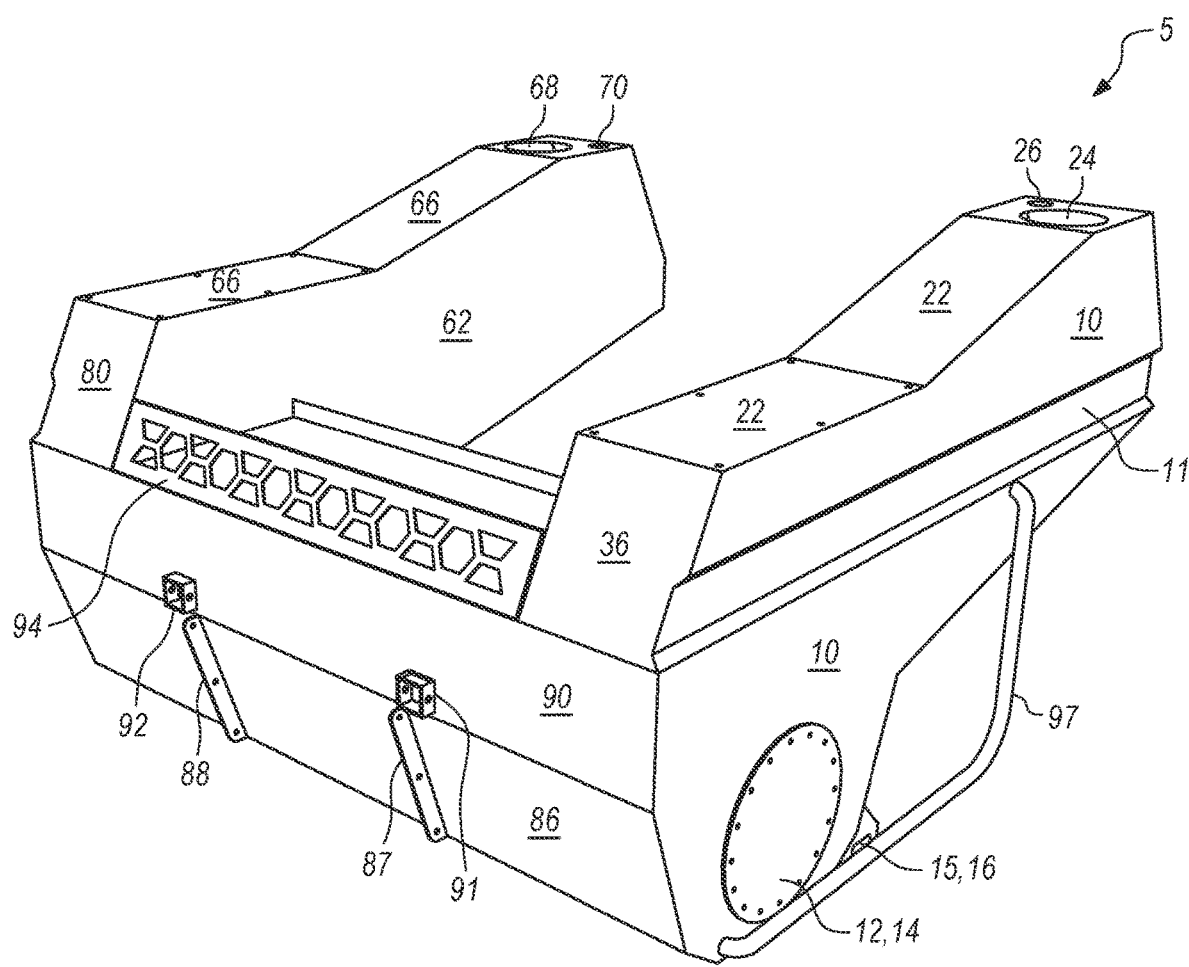
FIG. 17 is another perspective view of a 500 gallon size of liquid storage tank that is reversibly rigidly attachable to the lift arms of a skid steer loader or track loader.
Figure 18:
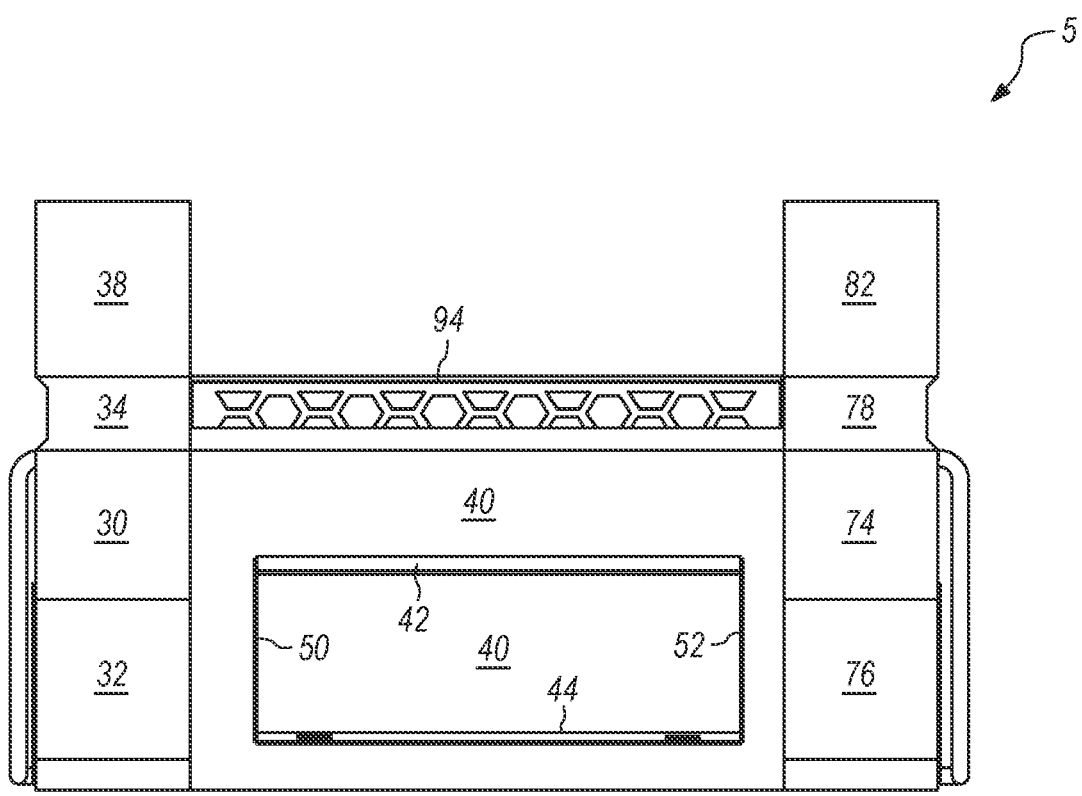
FIG. 18 is a rear elevation view of a 500 gallon size of liquid storage tank that is reversibly rigidly attachable to the lift arms of a skid steer loader or track loader.

Optionally, liquid storage tank that is reversibly rigidly attachable to the lift arms of a skid steer loader or track loader 5 may further comprise: a hydraulic pump 100 and a water nozzle 102. Hydraulic pump 100 is rigidly attached to liquid storage tank that is reversibly rigidly attachable to the lift arms of a skid steer loader or track loader 5. Hydraulic pump 100 is a water pump that is powered by hydraulics. Hydraulic pump 100 is powered by an input hydraulic line and an output hydraulic line. Hydraulic fluid enters through the input line and exits from the output line and the force of the flow of this hydraulic fluid through hydraulic pump 100 causes an impellor in the hydraulic pump 100 to spin which in turn pumps water to the water nozzle 102. Hydraulic pump 100 is connected to the hydraulic system of the skid steer or track loader 120 with one feed line and one return line. The operator of the skid steer or track loader 120 can operate the water nozzle 102 but turning the hydraulic pump 100 on and off from the cab. Hydraulic pump 100 is connected to the water nozzle 102 with a heavy duty plumbing line. There are many types of hydraulic water pumps on the market. Any known type of hydraulic pump may be used. In best mode, hydraulic pump 100 is a submersible hydraulic pump located on the interior bottom of the storage tank as depicted in FIG. 15.

Figure 2:
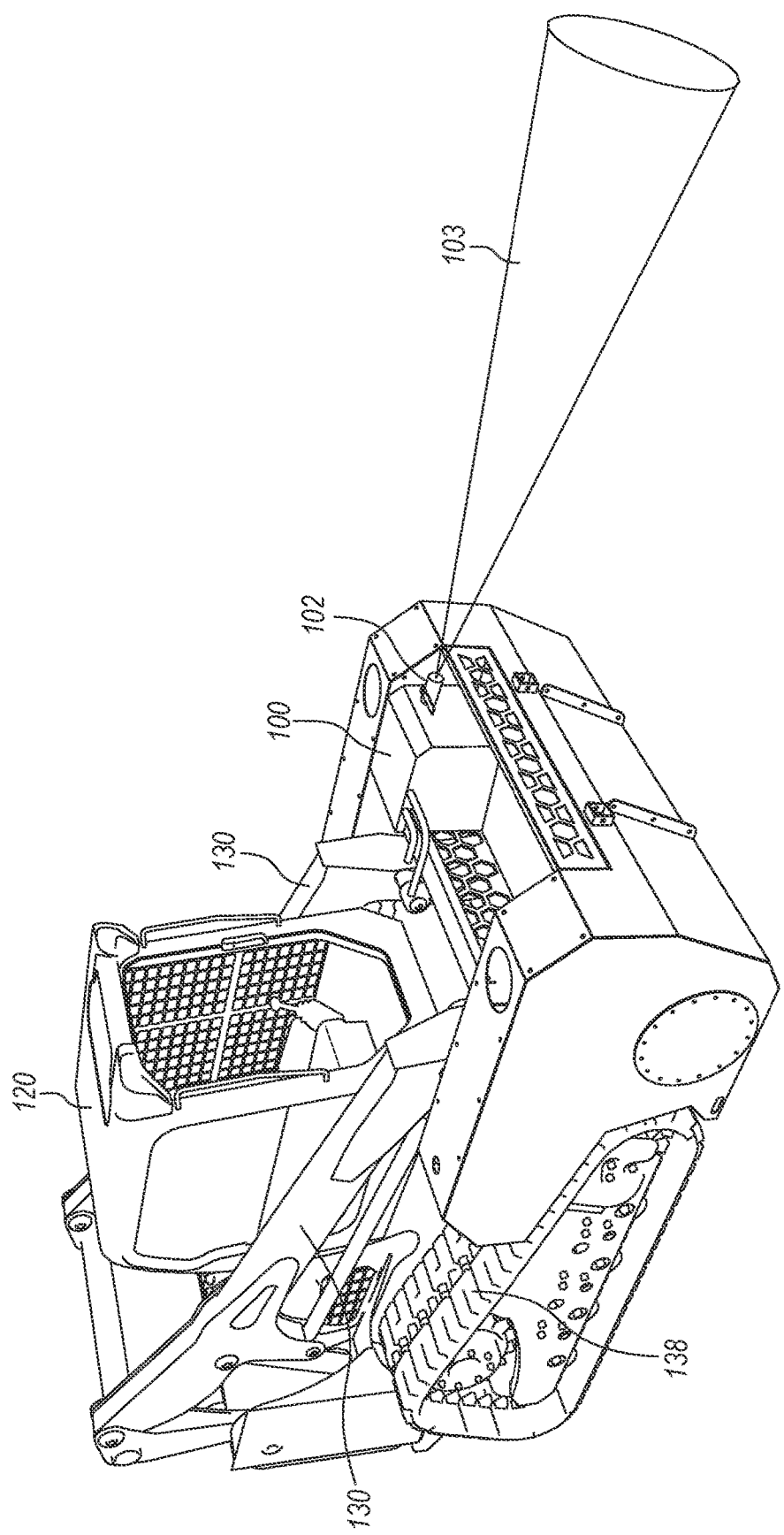
FIG. 2 is another perspective view of a first embodiment of the invention attached to the lift arms of a skid steer loader or track loader where the first embodiment includes a hydraulic water pump and a water nozzle for firefighting.

Water nozzle 102 is a rigid cylindrical shaped member or round spout member that is capable of directing the flow of water therethrough into a pattern such as a water jet or a water spray pattern. Water nozzle 102 is rigidly attached to liquid storage tank that is reversibly rigidly attachable to the lift arms of a skid steer loader or track loader 5. Typically, water nozzle 102 is located with its nozzle end pointed directly in front of the skid steer or track loader 5. Water nozzle 102 is connected to or piped into the hydraulic water pump 102. There are many different types of water nozzles in the market. Any known type of water nozzle may be used. In best mode, water nozzle 102 is a heavy duty nozzle capable of withstanding collisions with rocks, trees, and debris. Water nozzle 102 is connected to Hydraulic pump 100 by a heavy duty plumbing connection. All water pumped by hydraulic pump 100 is directed out of water nozzle 102. The operator can control the water nozzle 102 from the cab of the skid steer or track loader 120 by moving and rotating the storage tank with the lift arms of the skid steer in order to move water nozzle 102 and spray water 103 from the water nozzle 102 to extinguish wild fires. As stated above, with this embodiment or mode, the operator may lift liquid storage tank that is reversibly rigidly attachable to the lift arms of a skid steer loader or track loader 5 upward and downwards and also rotate liquid storage tank that is reversibly rigidly attachable to the lift arms of a skid steer loader or track loader 5 upwards and downwards in order to help navigate rugged terrain and to properly aim the water nozzle 102 at the wild fire. This embodiment is depicted in FIGS. 1, 2, and 15.

Optionally, liquid storage tank that is reversibly rigidly attachable to the lift arms of a skid steer loader or track loader 5 may further comprise: a hydraulic power generator 104.

Figure 3:
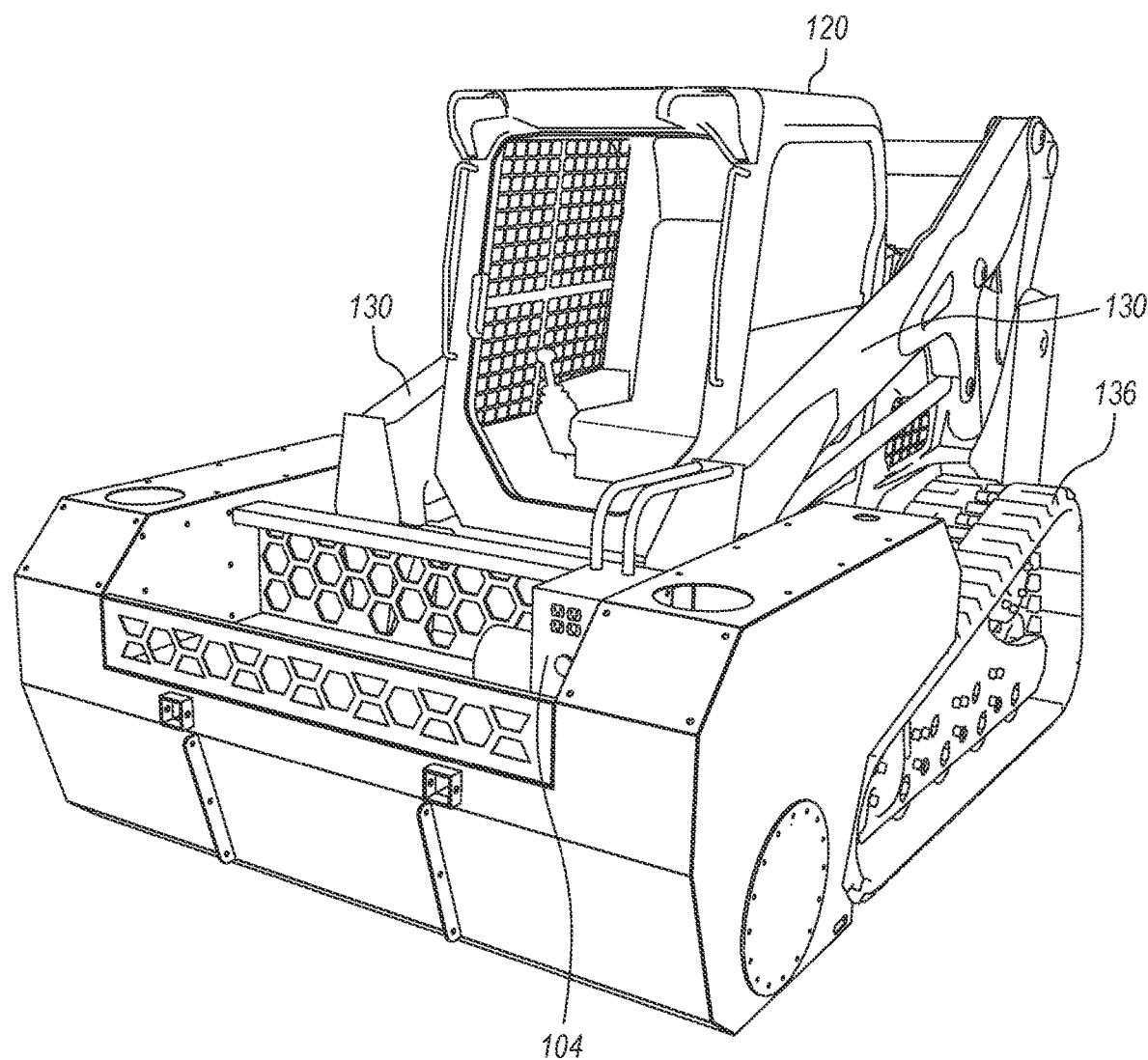
FIG. 3 is a perspective view of a second embodiment of the invention attached to the lift arms of a skid steer loader or track loader where the second embodiment includes a hydraulic power generator for machinery repair.
Figure 4:
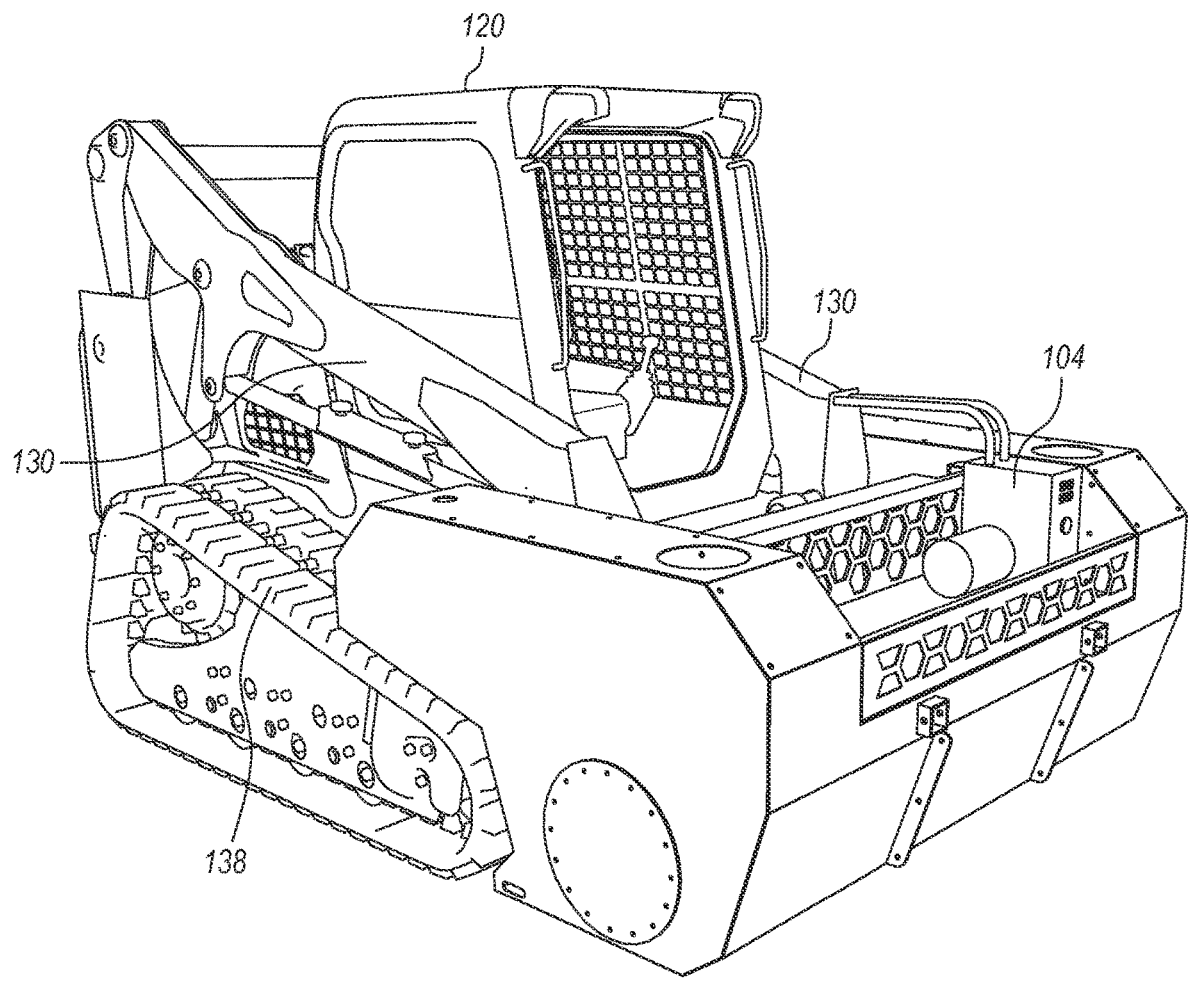
FIG. 4 is another perspective view of a second embodiment of the invention attached to the lift arms of a skid steer loader or track loader where the second embodiment includes a hydraulic power generator for machinery repair.

Hydraulic power generator 104 is rigidly attached to liquid storage tank that is reversibly rigidly attachable to the lift arms of a skid steer loader or track loader 5. Hydraulic power generator 104 is an electrical power generator that is powered by hydraulics. Hydraulic power generator 104 is powered by an input hydraulic line and an output hydraulic line. Hydraulic fluid enters through the input line and exits from the output line and the force of the flow hydraulic fluid through hydraulic power generator 104 causes a rotor to rotate within a stator or the stator to rotate around the rotor thereby generating electricity. As stated above, with this embodiment, power tools, such as a welder, may be plugged in and powered by hydraulic power generator 104 in order to make a repair to a piece of machinery that is broken-down deep in the back country far from any roads or access trails. There are many types of hydraulic power generators on the market. Any known type of hydraulic power generator may be used. This embodiment is depicted in FIGS. 3 and 4.

Figure 5:
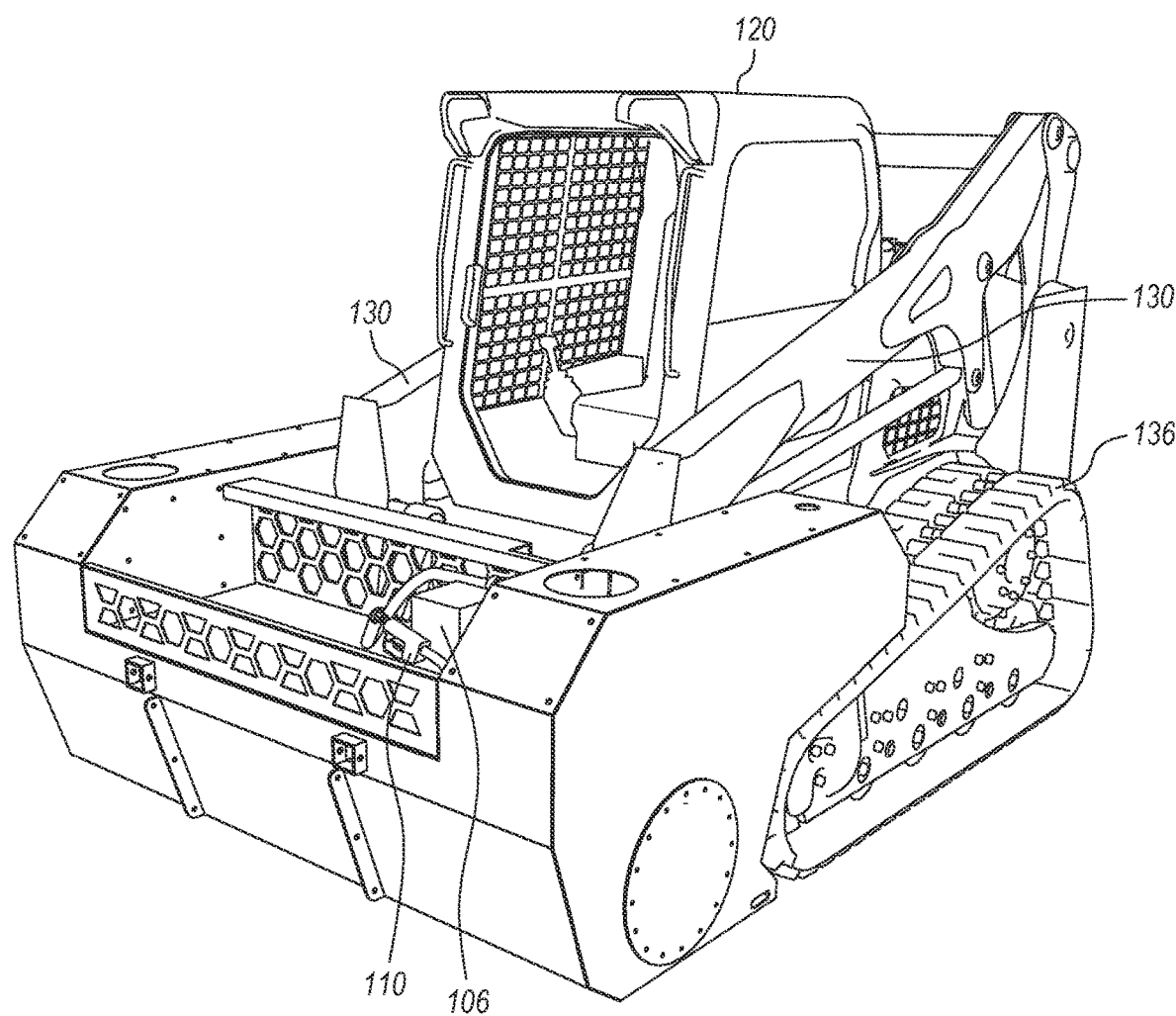
FIG. 5 is a perspective view of a third embodiment of the invention attached to the lift arms of a skid steer loader or track loader where the third embodiment includes an electric fuel pump for machinery refueling.
Figure 6:
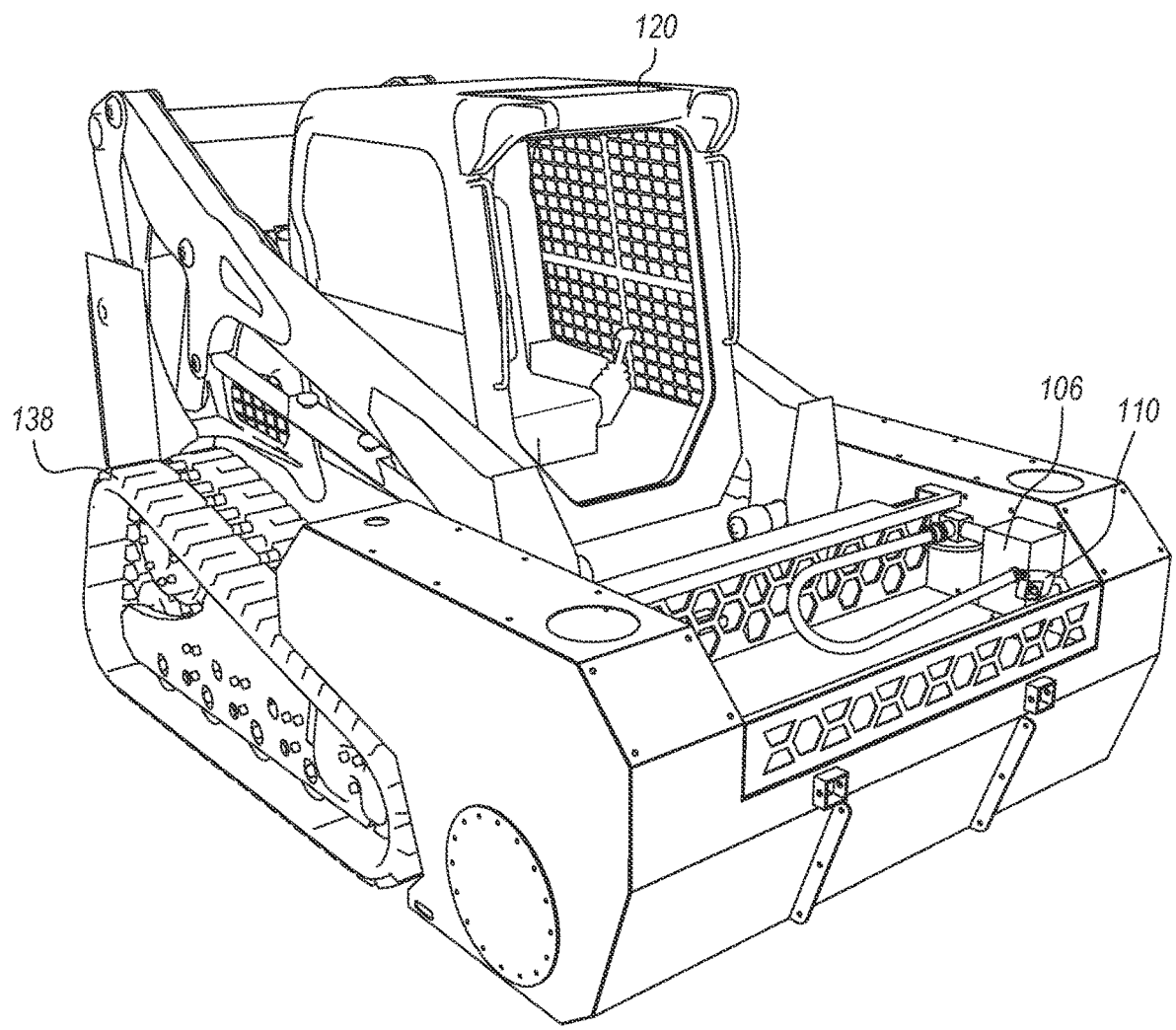
FIG. 6 is another perspective view of a third embodiment of the invention attached to the lift arms of a skid steer loader or track loader where the third embodiment includes an electric fuel pump for machinery refueling.
Figure 7:
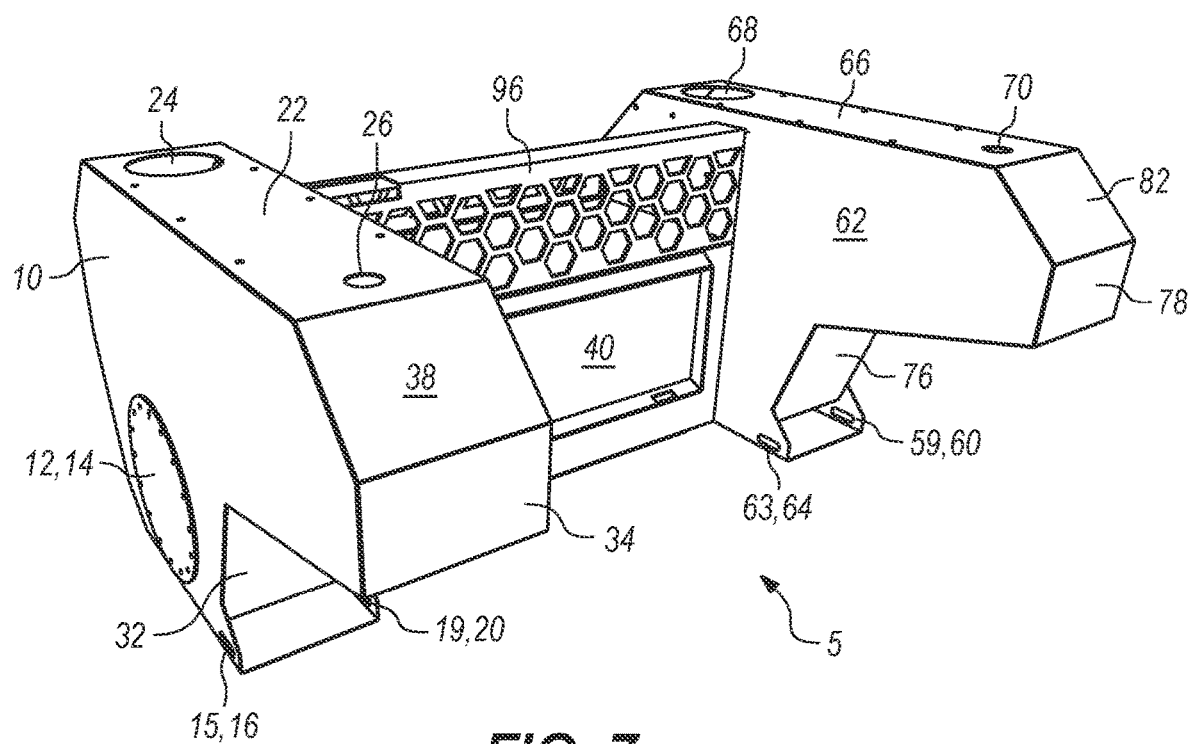
FIG. 7 is a perspective view of a 300 gallon size of liquid storage tank that is reversibly rigidly attachable to the lift arms of a skid steer loader or track loader.
Figure 8:
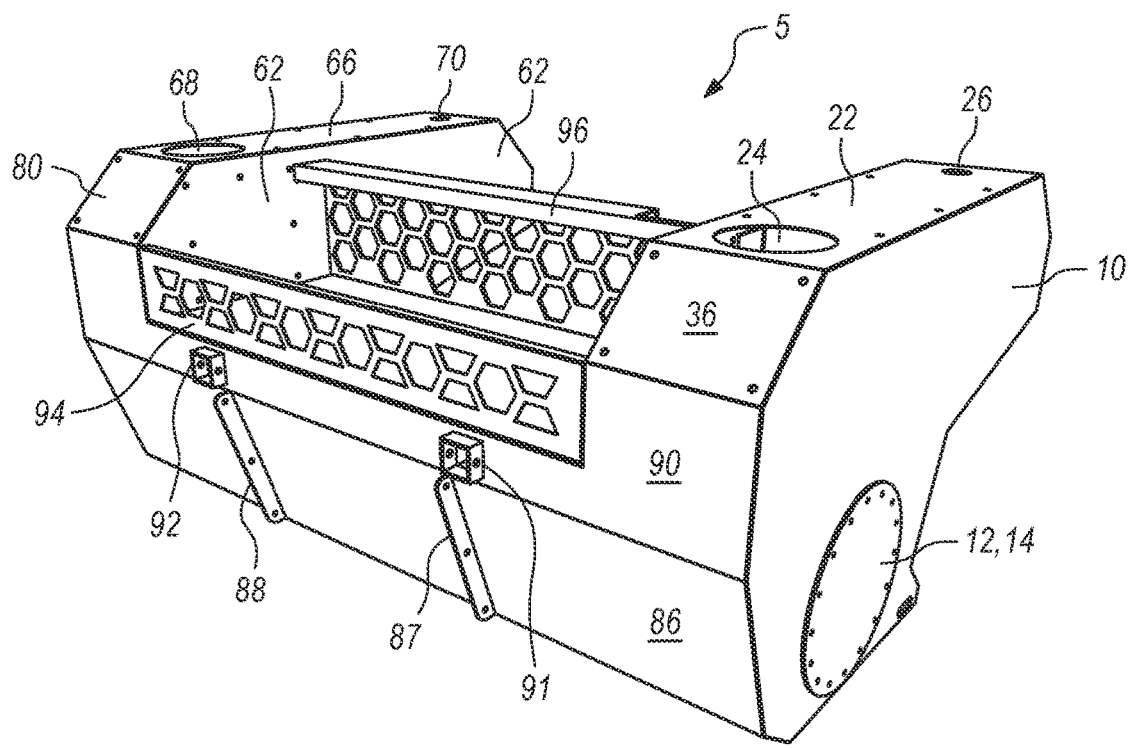
FIG. 8 is another perspective view of a 300 gallon size of liquid storage tank that is reversibly rigidly attachable to the lift arms of a skid steer loader or track loader.
Figure 9:
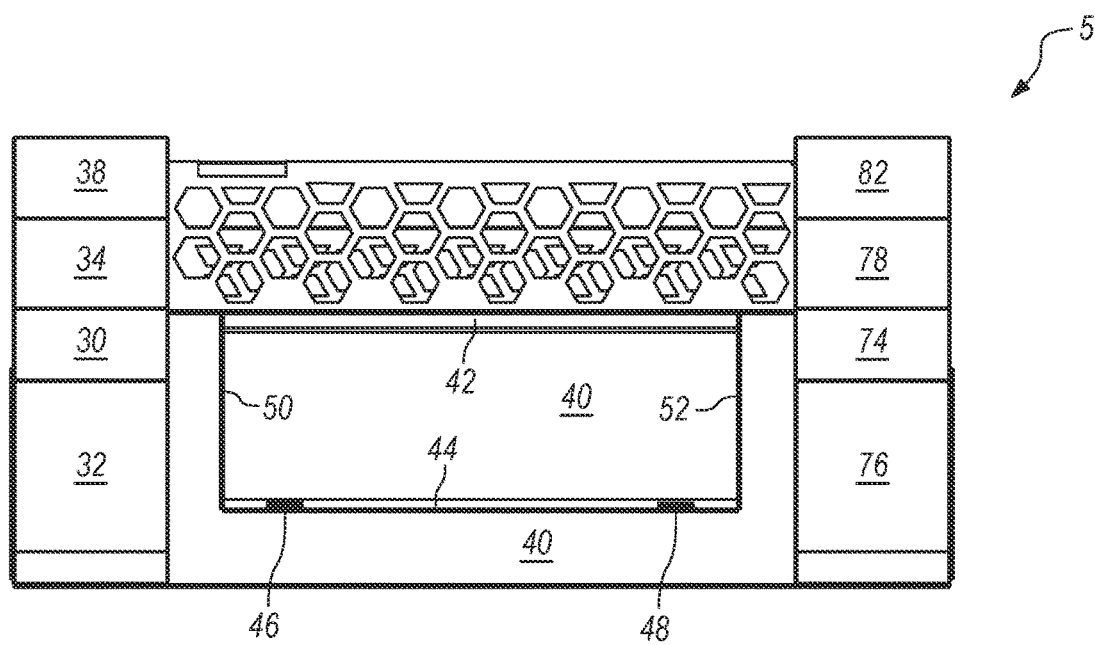
FIG. 9 is a rear elevation view of a 300 gallon size of liquid storage tank that is reversibly rigidly attachable to the lift arms of a skid steer loader or track loader.

Optionally, liquid storage tank that is reversibly rigidly attachable to the lift arms of a skid steer loader or track loader 5 may further comprise: an electric fuel pump 106 and a fuel pump nozzle 110. Electric fuel pump 106 is rigidly attached to liquid storage tank that is reversibly rigidly attachable to the lift arms of a skid steer loader or track loader 5. Electric fuel pump 106 is a fuel pump that is powered by a 6, 12, or 24 volt power source. Electric fuel pump 106 has a fuel pump nozzle 110. Fuel pump nozzle 110 is a rigid cylindrical shaped member or round spout member that is capable of directing the flow of fuel therethrough. Fuel pump nozzle 110 is connect to or piped into electric fuel pump 106. Fuel pump nozzle 110 is used to refuel the fuel tank of a vehicle or piece of machinery that may be located in the back country far from any roads or access trails. This embodiment is depicted in FIGS. 5 and 6.

What is claimed is:

1. A liquid storage tank that is reversibly rigidly attachable to the lift arms of a skid steer loader or track loader comprising: an outer left side panel; an inner left side panel; a left top panel; a main bottom panel; an left bottom panel; a lower left rear panel; an upper left rear panel; a left front diagonal panel; a left rear diagonal panel; a middle rear panel; an outer right side panel; an inner right side panel; a right top panel; a main top panel; an right bottom panel; a lower right rear panel; an upper right rear panel; a right front diagonal panel; a right rear diagonal panel; a first front panel; a second front panel; and a third front panel, wherein,
said outer left side panel is a rigid planar member that is a winged-shaped decagon or a ten-sided polygon,
said outer left side panel has an interior surface and an exterior surface,
said outer left side panel has a first side that is horizontal,
said first side of said outer left side panel is attached to a left side of said main bottom panel to form an airtight and watertight connection therebetween,
a second side of said outer left side panel is adjacent to said first side of said outer left side panel,
said second side of said outer left side panel forms an acute angle with said first side of said outer left side panel,
said second side of outer left side panel is attached to a left side of said first front panel to form an airtight and watertight connection therebetween,
a third side of said outer left side panel is adjacent to said second side of said outer left side panel,
said third side of said outer left side panel forms an acute angle with said second side of said outer left side panel,
said third side of said outer left side panel is attached to a left side of said second front panel to form an airtight and watertight connection therebetween,
a fourth side of said outer left side panel is adjacent to said third side of said outer left side panel,
said fourth side of said outer left side panel forms an acute angle with said third side of said outer left side panel,
said fourth side is vertical, said fourth side of said outer left side panel is attached to an eight side of said third front panel to form an airtight and watertight connection therebetween, a fifth side of said outer left side panel is adjacent to said fourth side of said outer left side panel, said fifth side of said outer left side panel forms an acute angle with said fourth side of said outer left side panel, said fifth side of said outer left side panel is attached to a left side of said left front diagonal panel to form an airtight and watertight connection therebetween, a sixth side of said outer left side panel is adjacent to said fifth side of said outer left side panel, said sixth side of said outer left side panel forms an acute angle with said fifth side of said outer left side panel, said sixth side is horizontal, said sixth side is attached to a left side of said left top panel to form an airtight and watertight connection therebetween, a seventh side of said outer left side panel is adjacent to said sixth side of said outer left side panel, said seventh side of outer left side panel forms an acute angle with said sixth side of said outer left side panel, said seventh side of said outer left side panel is attached to a left side of said left rear diagonal panel to form an airtight and watertight connection therebetween, an eighth side of said outer left side panel is adjacent to said seventh side of said outer left side panel, said eighth side of said outer left side panel forms an acute angle with said seventh side of said outer left side panel, said eighth side of said outer left side panel is vertical, said eighth side of said outer left side panel is attached to a left side of said upper left rear panel to form an airtight and watertight connection therebetween, a ninth side of said outer left side panel is adjacent to said eighth side of said outer left side panel, said ninth side of said outer left side panel forms an acute angle with said eighth side of said outer left side panel, said ninth side of said outer left side panel is attached to a left side of said left bottom panel to form an airtight and watertight connection therebetween, a tenth side of said outer left side panel is adjacent to said ninth side of said outer left side panel, said tenth side of said outer left side panel forms an acute angle with said ninth side of said outer left side panel, said tenth side of said outer left side panel is attached to a left side of said lower left rear panel to form an airtight and watertight connection therebetween, said inner left side panel is a rigid planar member that is a mirror image of said outer left side panel except with a rectangular notch cut out, said inner left side panel is decagon or a ten-sided polygon, said inner left side panel has an interior surface and an exterior surface, said inner left side panel has a first side that is horizontal, said inner left side panel has a second side that is vertical, said inner left side panel has a third side that is horizontal, said inner left side panel has a fourth side that is vertical, said inner left side panel has a fifth side, said inner left side panel has a sixth side, said inner left side panel has a seventh side, said inner left side panel has an eighth side, said inner left side panel has a ninth side, said inner left side panel has a tenth side, said left top panel is a rigid rectangular planar member with an interior surface, an exterior surface, a left side, a front side, a right side, and a rear side, said main bottom panel is a rigid rectangular planar member with an interior surface, an exterior surface, a left side, a front side, a right side, and a rear side, said left bottom panel is a rigid rectangular planar member with an interior surface, an exterior surface, a left side, a front side, a right side, and a rear side, said lower left rear panel is a rigid rectangular planar member with an interior surface, an exterior surface, a left side, a lower side, a right side, and an upper side, said upper left rear panel is a rigid rectangular planar member with an interior surface, an exterior surface, a left side, a lower side, a right side, and an upper side, said left front diagonal panel is a rigid rectangular planar member with an interior surface, an exterior surface, a left side, a front side, a right side, and a rear side, said left rear diagonal panel is a rigid rectangular planar member with an interior surface, an exterior surface, a left side, a front side, a right side, and a rear side, said middle rear panel is a rigid rectangular planar member with an interior surface, an exterior surface, a left side, a front side, a right side, and a rear side, said middle rear panel further comprises: a mount plate top flange; mount plate bottom flange; a mount plate left flange; and a mount plate right flange, said mount plate top flange is a rigid rectangular planar member with a longitudinal axis, a left side, a front side, a right side, and a rear side, said second side of said mount plate top flange is rigidly attached to said exterior surface of said middle rear panel with said longitudinal axis of said mount plate top flange parallel with and adjacent to said upper side of said middle rear panel, said mount plate bottom flange is a rigid rectangular planar member with a longitudinal axis, a left side, an upper side, a right side, and a lower side, said second side of said mount plate bottom flange is rigidly attached to said exterior surface of said middle rear panel with said longitudinal axis of said mount plate bottom flange parallel with and adjacent to said lower side of said middle rear panel, said mount plate bottom flange further comprises: a left slot or hole and a right slot or hole, said left slot or hole is a circular or slotted hole in said mount plate bottom flange that is located adjacent to said left side of said mount plate bottom flange, said right slot or hole is a circular or slotted hole in said mount plate bottom flange that is located adjacent to said right side of said mount plate bottom flange, said mount plate left flange is a rigid rectangular planar member with a longitudinal axis, a left side, a front side, a right side, and a rear side, said second side of said mount plate left flange is rigidly attached to said exterior surface of said middle rear panel with said longitudinal axis of said mount plate left flange parallel with and adjacent to said left side of said middle rear panel, said first side of said mount plate left flange is rigidly attached to said first side of said mount plate bottom flange, said third side of said mount plate left flange is rigidly attached to said first side of said mount plate top flange, said mount plate right flange is a rigid rectangular planar member with a longitudinal axis, a left side, a front side, a right side, and a rear side, said second side of said mount plate right flange is rigidly attached to said exterior surface of said middle rear panel with said longitudinal axis of said mount plate right flange parallel with and adjacent to said right side of said middle rear panel, said first side of said mount plate right flange is rigidly attached to said third side of said mount plate bottom flange, said third side of said mount plate right flange is rigidly attached to said third side of said mount plate top flange, said outer right side panel is a rigid planar member that is a winged-shaped decagon or a ten-sided polygon, said outer right side panel has an interior surface and an exterior surface, said outer right side panel has a first side that is horizontal, said first side of said outer right side panel is attached to a left side of said main bottom panel to form an airtight and watertight connection therebetween, a second side of said outer right side panel is adjacent to said first side of said outer right side panel, said second side of said outer right side panel forms an acute angle with said first side of said outer right side panel, said second side of outer right side panel is attached to a left side of said first front panel to form an airtight and watertight connection therebetween, a third side of said outer right side panel is adjacent to said second side of said outer right side panel, said third side of said outer right side panel forms an acute angle with said second side of said outer right side panel, said third side of said outer right side panel is attached to a left side of said second front panel to form an airtight and watertight connection therebetween, a fourth side of said outer right side panel is adjacent to said third side of said outer right side panel, said fourth side of said outer right side panel forms an acute angle with said third side of said outer right side panel, said fourth side is vertical, said fourth side of said outer right side panel is attached to an eight side of said third front panel to form an airtight and watertight connection therebetween, a fifth side of said outer right side panel is adjacent to said fourth side of said outer right side panel, said fifth side of said outer right side panel forms an acute angle with said fourth side of said outer right side panel, said fifth side of said outer right side panel is attached to a left side of said left front diagonal panel to form an airtight and watertight connection therebetween, a sixth side of said outer right side panel is adjacent to said fifth side of said outer right side panel, said sixth side of said outer right side panel forms an acute angle with said fifth side of said outer right side panel, said sixth side is horizontal, said sixth side is attached to a left side of said left top panel to form an airtight and watertight connection therebetween, a seventh side of said outer right side panel is adjacent to said sixth side of said outer right side panel, said seventh side of outer right side panel forms an acute angle with said sixth side of said outer right side panel, said seventh side of said outer right side panel is attached to a left side of said left rear diagonal panel to form an airtight and watertight connection therebetween, an eighth side of said outer right side panel is adjacent to said seventh side of said outer right side panel, said eighth side of said outer right side panel forms an acute angle with said seventh side of said outer right side panel, said eighth side of said outer right side panel is vertical, said eighth side of said outer right side panel is attached to a left side of said upper left rear panel to form an airtight and watertight connection therebetween, a ninth side of said outer right side panel is adjacent to said eighth side of said outer right side panel, said ninth side of said outer right side panel forms an acute angle with said eighth side of said outer right side panel, said ninth side of said outer right side panel is attached to a left side of said left bottom panel to form an airtight and watertight connection therebetween, a tenth side of said outer right side panel is adjacent to said ninth side of said outer right side panel, said tenth side of said outer right side panel forms an acute angle with said ninth side of said outer right side panel, said tenth side of said outer right side panel is attached to a left side of said lower left rear panel to form an airtight and watertight connection therebetween, said inner right side panel is a rigid planar member that is a mirror image of said outer right side panel except with a rectangular notch cut out, said inner right side panel is decagon or a ten-sided polygon, said inner right side panel has an interior surface and an exterior surface, said inner right side panel has a first side that is horizontal, said inner right side panel has a second side that is vertical, said inner right side panel has a third side that is horizontal, said inner right side panel has a fourth side that is vertical, said inner right side panel has a fifth side, said inner right side panel has a sixth side, said inner right side panel has a seventh side, said inner right side panel has an eighth side, said inner right side panel has a ninth side, said inner right side panel has a tenth side, said right top panel is a rigid rectangular planar member with an interior surface, an exterior surface, a left side, a front side, a right side, and a rear side, said main top panel is a rigid rectangular planar member with an interior surface, an exterior surface, a left side, a front side, a right side, and a rear side, said right bottom panel is a rigid rectangular planar member with an interior surface, an exterior surface, a left side, a front side, a right side, and a rear side, said lower right rear panel is a rigid rectangular planar member with an interior surface, an exterior surface, a left side, a lower side, a right side, and an upper side, said upper right rear panel is a rigid rectangular planar member with an interior surface, an exterior surface, a left side, a lower side, a right side, and an upper side, said right front diagonal panel is a rigid rectangular planar member with an interior surface, an exterior surface, a left side, a front side, a right side, and a rear side, said right rear diagonal panel is a rigid rectangular planar member with an interior surface, an exterior surface, a left side, a front side, a right side, and a rear side, said first front panel is a rigid rectangular planar member with an interior surface, an exterior surface, a left side, an upper side, a right side, and a lower side, said second front panel is a rigid rectangular planar member with an interior surface, an exterior surface, a left side, an upper side, a right side, and a lower side, said third front panel is a rigid planar member with an interior surface, an exterior surface, a first side, a second side, a third side, a fourth side, a fifth side, a sixth side, a seventh side, and an eighth side, said left side of said left top panel is attached to said sixth side of said outer left side panel to form an airtight and watertight connection therebetween, said front side of said left top panel is attached to said upper side of said left front diagonal panel to form an airtight and watertight connection therebetween, said right side of said left top panel is attached to said sixth side of said inner left side panel to form an airtight and watertight connection therebetween, said rear side of said left top panel is attached to said upper side of said left rear diagonal panel to form an airtight and watertight connection therebetween, said left side of said main bottom panel is attached to said first side of said outer left side panel to form an airtight and watertight connection therebetween, said rear side of said main bottom panel is attached to said lower side of middle rear panel to form an airtight and watertight connection therebetween, said right side of main bottom panel is attached to said lower side of said outer right side panel to form an airtight and watertight connection therebetween, said front side of said main bottom panel is attached to said lower side of said first front panel to form an airtight and watertight connection therebetween, said left side of said left bottom panel is attached to said ninth side of said outer left side panel to form an airtight and watertight connection therebetween, said front side of said left bottom panel is attached to said upper side of said lower left rear panel to form an airtight and watertight connection therebetween, said right side of said left bottom panel is attached to said ninth side of said inner left side panel to form an airtight and watertight connection therebetween, said rear side of said left bottom panel is attached to said lower side of said upper left rear panel to form an airtight and watertight connection therebetween, said left side of said lower left rear panel is attached to said tenth side of said outer left side panel to form an airtight and watertight connection therebetween, said lower side of said lower left rear panel is attached to said rear side of said main bottom panel to form an airtight and watertight connection therebetween, said right side of said lower left rear panel is attached to said tenth side of said inner left side panel to form an airtight and watertight connection therebetween, said upper side of said lower left rear panel is attached to said lower side of said left bottom panel to form an airtight and watertight connection therebetween, said left side of said upper left rear panel is attached to said eight side of said outer left side panel to form an airtight and watertight connection therebetween, said upper side of said upper left rear panel is attached to said lower side of said left rear diagonal panel to form an airtight and watertight connection therebetween, said right side of said upper left rear panel is attached to said eighth side of said inner left side panel to form an airtight and watertight connection therebetween, said lower side of said upper left rear panel is attached to said rear side of said left bottom panel to form an airtight and watertight connection therebetween, said left side of said left front diagonal panel is attached to said fifth side of said outer left side panel to form an airtight and watertight connection therebetween, said front side of said left front diagonal panel is attached to said seventh side of said third front panel to form an airtight and watertight connection therebetween, said right side of said left front diagonal panel is attached to said fifth side of said inner left side panel to form an airtight and watertight connection therebetween, said rear side of said left front diagonal panel is attached to said front side of said left top panel to form an airtight and watertight connection therebetween, said left side of said left rear diagonal panel is attached to said seventh side of said outer left side panel to form an airtight and watertight connection therebetween, said front side of said left rear diagonal panel is attached to said rear side of said left top panel to form an airtight and watertight connection therebetween, said right side of said left rear diagonal panel is attached to said seventh side of said inner left side panel to form an airtight and watertight connection therebetween, said rear side of said left rear diagonal panel is attached to said upper side of said upper left rear panel to form an airtight and watertight connection therebetween, said left side of said middle rear panel is attached to said seventh side of said outer left side panel to form an airtight and watertight connection therebetween, said upper side of said middle rear panel is attached to said rear side of said main top panel to form an airtight and watertight connection therebetween, said right side of said middle rear panel is attached to said seventh side of said inner left side panel to form an airtight and watertight connection therebetween, said lower side of said middle rear panel is attached to said rear side of said main bottom panel to form an airtight and watertight connection therebetween, said right side of said right top panel is attached to said sixth side of said outer right side panel to form an airtight and watertight connection therebetween, said front side of said right top panel is attached to said upper side of said right front diagonal panel to form an airtight and watertight connection therebetween, said left side of said right top panel is attached to said sixth side of said inner right side panel to form an airtight and watertight connection therebetween, said rear side of said right top panel is attached to said upper side of said right rear diagonal panel to form an airtight and watertight connection therebetween, said front side of said main top panel is attached to said fifth side of said third front panel to form an airtight and watertight connection therebetween, said left side of said main top panel is attached to said third side of said inner left side panel to form an airtight and watertight connection therebetween, said rear side of said main top panel is attached to said upper side of said middle rear panel to form an airtight and watertight connection therebetween, said right side of said main top panel is attached to said third side of said inner right side panel to form an airtight and watertight connection therebetween, said right side of said right bottom panel is attached to said ninth side of said outer right side panel to form an airtight and watertight connection therebetween, said front side of said right bottom panel is attached to said upper side of said lower right rear panel to form an airtight and watertight connection therebetween, said left side of said right bottom panel is attached to said ninth side of said inner right side panel to form an airtight and watertight connection therebetween, said rear side of said right bottom panel is attached to said lower side of said upper right rear panel to form an airtight and watertight connection therebetween, said right side of said lower right rear panel is attached to said tenth side of said outer right side panel to form an airtight and watertight connection therebetween, said lower side of said lower right rear panel is attached to said rear side of said main bottom panel to form an airtight and watertight connection therebetween, said left side of said lower right rear panel is attached to said tenth side of said inner right side panel to form an airtight and watertight connection therebetween, said upper side of said lower right rear panel is attached to said lower side of said right bottom panel to form an airtight and watertight connection therebetween, said right side of said upper right rear panel is attached to said eighth side of said outer right side panel to form an airtight and watertight connection therebetween, said upper side of said upper right rear panel is attached to said lower side of said right rear diagonal panel to form an airtight and watertight connection therebetween, said left side of said upper right rear panel is attached to said eight side of said inner right side panel to form an airtight and watertight connection therebetween, said lower side of said upper right rear panel is attached to said rear side of said right bottom panel to form an airtight and watertight connection therebetween, said right side of said right front diagonal panel is attached to said fifth side of said outer right side panel to form an airtight and watertight connection therebetween, said front side of said right front diagonal panel is attached to said third side of said third front panel to form an airtight and watertight connection therebetween, said left side of said right front diagonal panel is attached to said fifth side of said inner right side panel to form an airtight and watertight connection therebetween, said rear side of said right front diagonal panel is attached to said front side of said right top panel to form an airtight and watertight connection therebetween, said right side of said right rear diagonal panel is attached to said seventh side of said outer right side panel to form an airtight and watertight connection therebetween, said front side of said right rear diagonal panel is attached to said rear side of said right top panel to form an airtight and watertight connection therebetween, said left side of said right rear diagonal panel is attached to said seventh side of said inner right side panel to form an airtight and watertight connection therebetween, said rear side of said right rear diagonal panel is attached to said upper side of said upper right rear panel to form an airtight and watertight connection therebetween, said left side of said first front panel is attached to said second side of said outer left side panel to form an airtight and watertight connection therebetween, said upper side of said first front panel is attached to said lower side of said second front panel to form an airtight and watertight connection therebetween, said right side of said first front panel is attached to said second side of said outer right side panel to form an airtight and watertight connection therebetween, said lower side of said first front panel is attached to said front side of said main bottom panel to form an airtight and watertight connection therebetween, said left side of said second front panel is attached to said third side of said outer left side panel to form an airtight and watertight connection therebetween, said upper side of said second front panel is attached to said lower side of said third front panel to form an airtight and watertight connection therebetween, said right side of said second front panel is attached to said third side of said outer right side panel to form an airtight and watertight connection therebetween, said lower side of said second front panel is attached to said upper side of said first front panel to form an airtight and watertight connection therebetween, said first side of said third front panel is attached to said upper side of said second front panel to form an airtight and watertight connection therebetween, said second side of said third front panel is attached to said fourth side of said outer right side panel to form an airtight and watertight connection therebetween, said third side of said third front panel is attached to said front side of said right front diagonal panel to form an airtight and watertight connection, said fourth side of said third front panel is attached to said fourth side of said inner right side panel to form an airtight and watertight connection therebetween, said fifth side of said third front panel is attached to said front side of said main top panel to form an airtight and watertight connection therebetween, said sixth side of said third front panel is attached to said fourth side of said inner left side panel to form an airtight and watertight connection therebetween, said seventh side of said third front panel is attached to said front side of said left front diagonal panel to form an airtight and watertight connection therebetween, and said eighth side of said third front panel is attached to said fourth side of said outer left side panel to form an airtight and watertight connection therebetween, thereby forming a watertight chamber, tank, or container with a wing-shaped profile that holds at least 300 gallons of liquid.

2. The liquid storage tank that is reversibly rigidly attachable to the lift arms of a skid steer loader or track loader as recited in claim 1 further comprising: a hydraulic pump and a water nozzle, wherein, said hydraulic pump is a water pump that is powered by hydraulics, said hydraulic pump is rigidly attached to said liquid storage tank that is reversibly rigidly attachable to the lift arms of a skid steer loader or track loader, said hydraulic pump is connected to a hydraulic system on said liquid storage tank that is reversibly rigidly attachable to the lift arms of a skid steer loader or track loader the skid steer or track loader, said water nozzle is a rigid cylindrical shaped member or round spout member that is capable of directing flow of water therethrough, said water nozzle is rigidly attached to said liquid storage tank that is reversibly rigidly attachable to the lift arms of a skid steer loader or track loader, and said water nozzle is connected to or piped into said hydraulic water pump.

3. The liquid storage tank that is reversibly rigidly attachable to the lift arms of a skid steer loader or track loader as recited in claim 1 further comprising: a hydraulic power generator, wherein, said hydraulic power generator is rigidly attached to said liquid storage tank that is reversibly rigidly attachable to the lift arms of a skid steer loader or track loader, said hydraulic power generator is an electrical power generator that is powered by hydraulics, and said hydraulic power generator is connected to said hydraulic system on said liquid storage tank that is reversibly rigidly attachable to the lift arms of a skid steer loader or track loader the skid steer or track loader.

4. The liquid storage tank that is reversibly rigidly attachable to the lift arms of a skid steer loader or track loader as recited in claim 1 further comprising: an electric fuel pump and a fuel pump nozzle, wherein, said electric fuel pump is rigidly attached to said liquid storage tank that is reversibly rigidly attachable to the lift arms of a skid steer loader or track loader, said electric fuel pump is a fuel pump that is powered by a 6, 12, or 24 volt power source, said fuel pump nozzle is a rigid cylindrical shaped member or round spout member that is capable of directing flow of fuel therethrough, and said fuel pump nozzle is connect to or piped into said electric fuel pump.

5. The liquid storage tank that is reversibly rigidly attachable to the lift arms of a skid steer loader or track loader as recited in claim 1 wherein, said outer left side panel has a left horizontal brake or dimple, said left horizontal brake or dimple is horizontal channel or rectangular trough running across said outer surface of said outer left side panel, said outer right side panel has a right horizontal brake or dimple, said right horizontal brake or dimple is horizontal channel or rectangular trough running across said outer surface of said outer right side panel, said left top panel is corrugated with a set of two brakes or bends wherein each of said set of two brakes or bends is perpendicular to said longitudinal axis of said left top panel to yield a three-panel or a three-plane rigid member, and said right top panel is corrugated with a set of two brakes or bends wherein each of said set of two brakes or bends is perpendicular to said longitudinal axis of said left top panel to yield a three-panel or a three-plane rigid member.

6. The liquid storage tank that is reversibly rigidly attachable to the lift arms of a skid steer loader or track loader as recited in claim 5 further comprising: a hydraulic pump and a water nozzle, wherein, said hydraulic pump is a water pump that is powered by hydraulics, said hydraulic pump is rigidly attached to said liquid storage tank that is reversibly rigidly attachable to the lift arms of a skid steer loader or track loader, said hydraulic pump is connected to a hydraulic system on said liquid storage tank that is reversibly rigidly attachable to the lift arms of a skid steer loader or track loader the skid steer or track loader, said water nozzle is a rigid cylindrical shaped member or round spout member that is capable of directing flow of water therethrough, said water nozzle is rigidly attached to said liquid storage tank that is reversibly rigidly attachable to the lift arms of a skid steer loader or track loader, and said water nozzle is connected to or piped into said hydraulic water pump.

7. The liquid storage tank that is reversibly rigidly attachable to the lift arms of a skid steer loader or track loader as recited in claim 5 further comprising: a hydraulic power generator, wherein, said hydraulic power generator is rigidly attached to said liquid storage tank that is reversibly rigidly attachable to the lift arms of a skid steer loader or track loader, said hydraulic power generator is an electrical power generator that is powered by hydraulics, and said hydraulic power generator is connected to said hydraulic system on said liquid storage tank that is reversibly rigidly attachable to the lift arms of a skid steer loader or track loader the skid steer or track loader.

8. The liquid storage tank that is reversibly rigidly attachable to the lift arms of a skid steer loader or track loader as recited in claim 5 further comprising: an electric fuel pump and a fuel pump nozzle, wherein, said electric fuel pump is rigidly attached to said liquid storage tank that is reversibly rigidly attachable to the lift arms of a skid steer loader or track loader, said electric fuel pump is a fuel pump that is powered by a 6, 12, or 24 volt power source, said fuel pump nozzle is a rigid cylindrical shaped member or round spout member that is capable of directing flow of fuel therethrough, and said fuel pump nozzle is connect to or piped into said electric fuel pump.

\* \* \* \* \*